US012785058B1

(12) United States Patent
Papanastasiou et al.

(10) Patent No.: US 12,785,058 B1
(45) Date of Patent: Nov. 3, 2026

(54) ION ANALYSIS APPARATUS AND METHOD

(71) Applicant: BRUKER SWITZERLAND AG, Fällanden (CH)

(72) Inventors: Dimitris Papanastasiou, Fällanden (CH); Melvin Park, Fällanden (CH); Benjamin Jones, Fällanden (CH); Mark Ridgeway, Fällanden (CH)

(73) Assignee: BRUKER SWITZERLAND AG, Fällanden (CH)

( * ) Notice: Subject to any disclaimer, the term of this patent is extended or adjusted under 35 U.S.C. 154(b) by 0 days.

(21) Appl. No.: 19/638,217

(22) Filed: Apr. 3, 2026

(51) Int. Cl.
*H01J 49/42* (2006.01)
*H01J 49/00* (2006.01)

(52) U.S. Cl.
CPC ...... *H01J 49/4295* (2013.01); *H01J 49/0031* (2013.01); *H01J 49/4215* (2013.01); *H01J 49/427* (2013.01)

(58) Field of Classification Search
CPC ............... H01J 49/4295; H01J 49/0031; H01J 49/4215; H01J 49/427
USPC ................................ 250/281, 282, 287, 288
See application file for complete search history.

(56) References Cited

U.S. PATENT DOCUMENTS 12,261,034 B1 * 3/2025 Papanastasiou .... H01J 49/4215

* cited by examiner

*Primary Examiner* — Michael Maskell
(74) *Attorney, Agent, or Firm* — IP KONCEPTS LLC; Franco S. De Liguori

(57) ABSTRACT

An apparatus comprises an array of RF ion accumulation devices, including a first RF ion accumulation device having a first ion entrance, a first ion exit, and a first set of electrodes, including a first electrode disposed at, proximal and/or adjacent to the first ion exit. An ion fragmentation device having an ion entrance and an ion exit is disposed mutually in series with the array of RF ion accumulation devices and downstream thereof. A set of power supplies, including a first power supply electrically coupled to the first set of electrodes, is configured to provide a first axial potential barrier at, proximal and/or adjacent to the first ion exit. A controller is configured to control the set of power supplies in a first configuration, wherein the first axial potential barrier prevents exit of ions within a selected mass-to-charge ratio (m/z) range, and in a second configuration, wherein the first axial potential barrier permits exit of ions within a selected m/z sub-range via the first ion exit.

20 Claims, 19 Drawing Sheets

ION ANALYSIS APPARATUS AND METHOD

BACKGROUND OF THE INVENTION

Field

The present invention relates to mass spectrometers, particularly to improving duty cycle of sampling an ion flux.

Background Information

Conventional mass spectrometers are typically limited by low duty cycle, for example due to a mismatch between producing a continuous ion flux in the ion source and non-continuous sampling of the continuous ion flux, for example using a scanning device such as a quadrupole mass filter or a trapping device for accumulating ions or performing a mass analysis step using a pulsed mass analyzer. This is a foundational limitation in mass spectrometry that severely reduces throughput by discarding most ions produced by the ion source. Consequently, only a tiny fraction of the produced ions is utilized for identification and/or structural characterization of analytes.

For example, proteomics analysis requires extremely high sensitivity and dynamic range for optimal results. Limitations in proteome profiling depth can be caused by a number of factors, including: ion utilization efficiency of the quadrupole mass filter (when ions are isolated, other ions entering the quadrupole at the same time are rejected); the limited repetition rate of mass analyzers; and the finite capacity of trapping devices typically employed for parallel accumulation (in which ions are accumulated in parallel with analysis of previously-accumulated ions).

Trapped ion mobility spectrometry (TIMS) provides a solution in that parallel accumulation allows the instrument to maintain near 100% duty cycle prior to the analytical quadrupole. In TIMS, ions produced in the ion source are separated in time via their respective mobilities such that not all ions from the ion source enter the analytical quadrupole at the same time, whereby the percentage of ions rejected during selection by the analytical quadrupole is reduced. TIMS, however, may be limited in terms of ion capacity and therefore the proteome profiling depth achieved may be compromised. Additionally and/or alternatively, other factors may limit TIMS performance including: RF ion heating at high pressure leading to fragmentation under heavy space charge conditions; non-uniform profile of the gas flow driving separation and causing a spread in ion mobility for any given species which limits the resolution of the device, in addition to practical limits to the gas throughput setting a limit to the physical dimensions of the device, hence restricting ion capacity; and/or suppression of low abundance species when mixing with high abundance precursors occurs during accumulation.

Beyond the limitations due to the low duty cycle of conventional mass spectrometers, another problem is the finite ion storage capacity of ion mobility cells and ion traps, for example, typically used for ion processing and/or for parallel accumulation. An excess number of ions distorts electric fields within devices such as radio-frequency (RF) multipoles, TIMS analyzers, and RF-trapping devices, for example. This distortion of the electric fields degrades mass resolution, compromises quantitative accuracy and/or limits throughput. Such devices saturate quickly, especially under the high throughput conditions typically encountered in high sensitivity conventional mass spectrometers equipped with high-flux ion sources producing >1M ions per millisecond.

Ion confinement regions (ion traps, ion funnels, mobility cells, drift tubes, quadrupole guides) cannot accommodate such high ion fluxes without accumulating charge to levels that distort the electric fields.

Hence, there is a need for devices having higher space charge capacity, that improve ion utilization efficiency and/or enhance profiling depth. Additionally and/or alternatively, there is a need for devices that allow storing, accumulating and transferring ions between different regions of a mass spectrometer in a highly synchronized manner to increase duty cycle.

SUMMARY OF THE INVENTION

A first aspect provides an apparatus comprising:

- an array of RF ion accumulation devices, including a first RF ion accumulation device having a first ion entrance, a first ion exit and a first set of electrodes, including a first electrode, disposed at, proximal and/or adjacent to the first ion exit;
- an ion fragmentation device having an ion entrance and an ion exit, disposed mutually in series with the array of RF ion accumulation devices and wherein the ion fragmentation device is disposed downstream of the array of RF ion accumulation devices;
- a set of power supplies, including a first power supply electrically coupled to the first set of electrodes and configured to provide a first axial potential barrier at, proximal and/or adjacent to the first ion exit; and
- a controller configured to control the set of power supplies in:
- a first configuration, wherein the first axial potential barrier prevents exit of ions, within a selected mass to charge ratio m/z range, from the first RF ion accumulation device via the first ion exit;
- a second configuration, wherein the first axial potential barrier permits exit of the ions, within a selected mass to charge ratio m/z sub-range of the selected mass to charge ratio m/z range, from the first RF ion accumulation device via the first ion exit.

A second aspect provides a method of mass spectrometry, the method comprising:

- introducing ions into an array of RF ion accumulation devices, including a first RF ion accumulation device having a first ion entrance and a first ion exit;
- preventing exit of the ions, within a selected mass to charge ratio m/z range, from the first RF ion accumulation device via the first ion exit by providing a first axial pseudo-potential barrier at, proximal and/or adjacent to the first ion exit;
- permitting exit of the ions, within a selected mass to charge ratio m/z sub-range of the selected mass to charge ratio m/z range, from the first RF ion accumulation device via the first ion exit by controlling the first axial potential barrier; and
- fragmenting the exiting ions, within the selected mass to charge ratio m/z sub-range of the selected mass to charge ratio m/z range, in an ion fragmentation device, having an ion entrance and an ion exit.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE INVENTION

Figure 1:
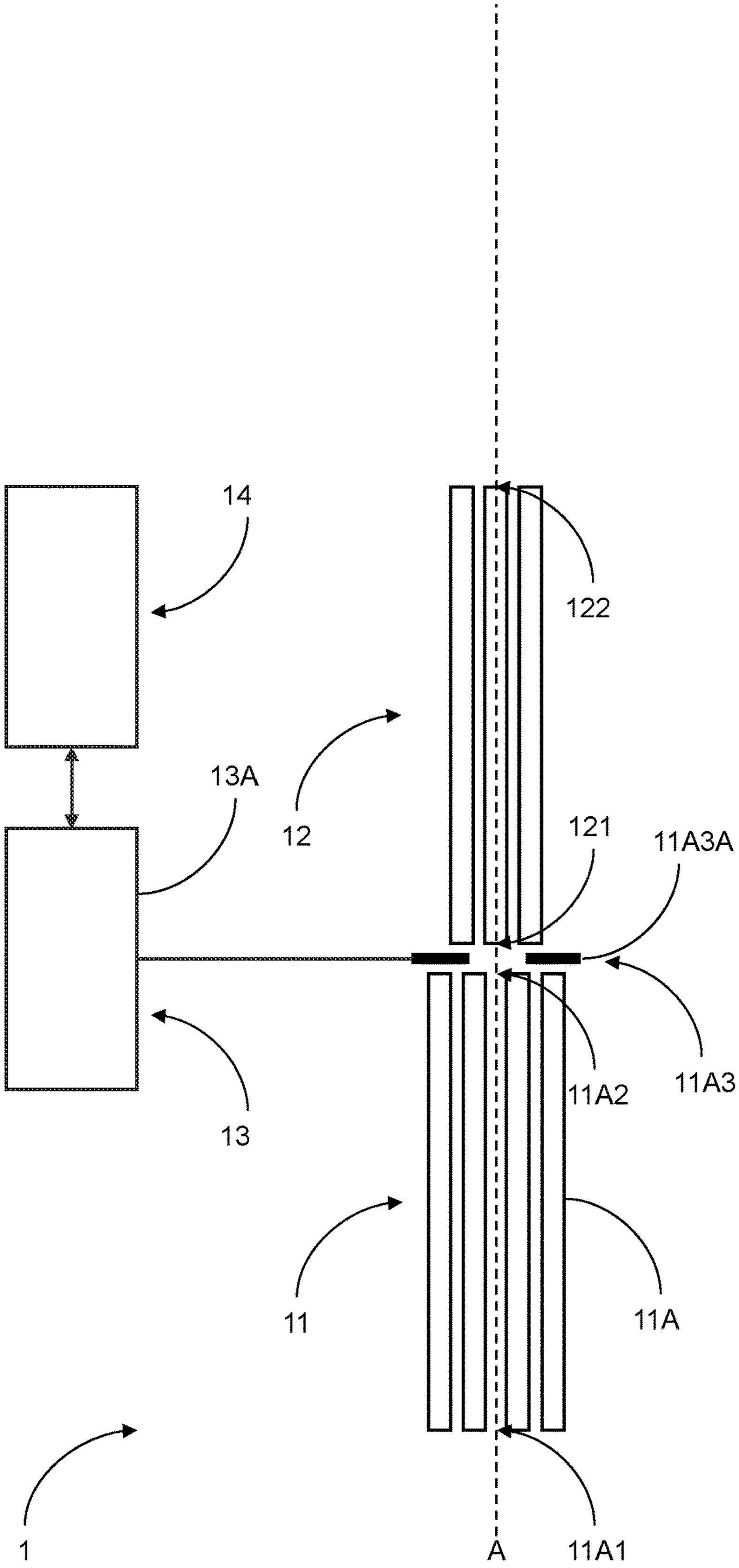
FIG. 1 schematically depicts an apparatus according to an exemplary embodiment.

According to the present invention there is provided an apparatus, as set forth in the appended claims. Also provided is a method. Other features of the invention will be apparent from the dependent claims, and the description that follows.

Apparatus

The first aspect provides an apparatus comprising:

an array of RF ion accumulation devices, including a first RF ion accumulation device having a first ion entrance, a first ion exit and a first set of electrodes, including a first electrode, disposed at, proximal and/or adjacent to the first ion exit;

an ion fragmentation device having an ion entrance and an ion exit, disposed mutually in series with the array of RF ion accumulation devices and wherein the ion fragmentation device is disposed downstream of the array of RF ion accumulation devices;

a set of power supplies, including a first power supply electrically coupled to the first set of electrodes and configured to provide a first axial potential barrier at, proximal and/or adjacent to the first ion exit; and a controller configured to control the set of power supplies in:

a first configuration, wherein the first axial potential barrier prevents exit of ions, within a selected mass to charge ratio m/z range, from the first RF ion accumulation device via the first ion exit;

a second configuration, wherein the first axial potential barrier permits exit of the ions, within a selected mass to charge ratio m/z sub-range of the selected mass to charge ratio m/z range, from the first RF ion accumulation device via the first ion exit.

In this way, the apparatus may be configured in the first configuration, wherein ions are accumulated in the first RF ion accumulation device, and subsequently configured in the second configuration, wherein the accumulated ions within a selected mass to charge ratio m/z sub-range exit (e.g. are released from or are ejected from) the first accumulation device. By accumulating the ions in the first RF ion accumulation device in the first configuration, a continuous ion flux from an ion source may be accumulated, for example continuously, intermittently, periodically or aperiodically, for example according to a predetermined and/or a dynamically determined accumulated charge capacity threshold, ion utilization efficiency is improved. By controlling the first axial potential barrier, accumulated ions within successively mutually different (for example partially overlapping or adjacent) selected mass to charge ratio m/z sub-ranges may successively exit the first accumulation device, in turn. In this way, accumulated ions may exit the first accumulation device according to mass to charge ratio m/z, for example from relatively higher mass to charge ratio m/z to relatively lower mass to charge ratio m/z, for example during (or over) a predetermined duration. This exit of the accumulated ions from the first accumulation device according to mass to charge ratio m/z may be synchronised with downstream processing, for example fragmentation in the fragmentation device, quadrupole mass filtering and/or ion mobility separation. In this way, profiling depth is enhanced while duty cycle is increased by the synchronization.

For example, in this way, the apparatus may simultaneously synchronize two or more of:

i. storage of ions from a continuous ion source in an upstream ion storage device and transfer of the stored ions therefrom to the array of RF ion accumulation devices;

ii. accumulation of ions in the array of RF ion accumulation devices and release of the accumulated ions therefrom according to respective mass to charge ratio m/z, for example in order from relatively higher mass to charge ratio m/z to relatively lower mass to charge ratio m/z as a function of time, over a millisecond timescale, whereby this order is maintained downstream, for example temporally and/or spatially;

iii. mass filtering of the m/z-ordered ions in a downstream quadrupole mass filter;

iv. fragmentation (more generally activation/dissociation) of the m/z-ordered ions in a downstream fragmentation device and release of the product ions of the m/z-ordered ions over a microsecond timescale; and v. m/z analysis of the product ions of the m/z-ordered ions in a downstream mass analyzer such as an OA TOF mass analyzer.

In this way, ion utilization efficiency or duty cycle is improved and/or profiling depth enhanced.

In one preferred example, the apparatus comprises:

an array of RF ion accumulation devices, including a first RF ion accumulation device having a first ion entrance, a first ion exit and a first set of electrodes, including a first electrode, disposed at, proximal and/or adjacent to the first ion exit;

an ion fragmentation device having an ion entrance and an ion exit, disposed mutually in series with the array of RF ion accumulation devices and wherein the ion fragmentation device is disposed downstream of the array of RF ion accumulation devices;

a set of power supplies, including a first power supply electrically coupled to the first set of electrodes and configured to provide a first axial potential barrier at, proximal and/or adjacent to the first ion exit, wherein the first axial potential barrier is mass to charge ratio m/z dependent and provided by first AC voltage, having an amplitude and a frequency; and a controller configured to control the set of power supplies in:

a first configuration, wherein the amplitude of the first AC voltage is constant and whereby the first axial potential barrier prevents exit of ions, within a selected mass to charge ratio m/z range, from the first RF ion accumulation device via the first ion exit;

a second configuration, wherein the amplitude of the first AC voltage is decreased as a function of time and whereby the first axial potential barrier permits exit of the ions, within successive selected mass to charge ratio m/z sub-ranges of the selected mass to charge ratio m/z range, from relatively higher mass to charge ratio m/z to relatively lower mass to charge ratio m/z as a function of time, from the first RF ion accumulation device via the first ion exit.

In one preferred example, the apparatus comprises:

an ion storage device, configured to store ions, comprising an electrode, configured to provide an axial potential barrier at, proximal and/or adjacent to an ion exit thereof, to control storage of ions therein and release of stored ions therefrom;

an array of RF ion accumulation devices, including a first RF ion accumulation device having a first ion entrance, a first ion exit and a first set of electrodes, including a first electrode, disposed at, proximal and/or adjacent to the first ion exit, wherein the ion storage device is disposed upstream of the array of RF ion accumulation devices;

wherein the ion storage device and the array of RF ion accumulation devices are provided by respective regions of a segmented RF multipole ion guide and/or a RF stacked ring ion guide; an ion fragmentation device having an ion entrance and an ion exit, disposed mutually in series with the array of RF ion accumulation devices and wherein the ion fragmentation device is disposed downstream of the array of RF ion accumulation devices;

an ion guide, having an ion entrance and an ion exit, disposed mutually in series with the array of RF ion accumulation devices and wherein the ion guide is disposed downstream of the array of RF ion accumulation devices, wherein the ion guide comprises and/or is a quadrupole ion guide;

a quadrupole mass filter, having an ion entrance and an ion exit, disposed mutually in series with the array of RF ion accumulation devices and wherein the quadrupole mass filter is disposed downstream of the array of RF ion accumulation devices and the ion guide;

wherein a Q value of the quadrupole ion guide is configured to match a Q value of the quadrupole mass filter;

a set of power supplies, including a first power supply electrically coupled to the first set of electrodes and configured to provide a first axial potential barrier at, proximal and/or adjacent to the first ion exit, wherein the first axial potential barrier is mass to charge ratio m/z dependent and provided by first AC voltage, having an amplitude and a frequency; and a controller configured to control the set of power supplies in:

a first configuration, wherein the amplitude of the first AC voltage is constant and whereby the first axial potential barrier prevents exit of ions, within a selected mass to charge ratio m/z range, from the first RF ion accumulation device via the first ion exit;

a second configuration, wherein the amplitude of the first AC voltage is decreased as a function of time and whereby the first axial potential barrier permits exit of the ions, within successive selected mass to charge ratio m/z sub-ranges of the selected mass to charge ratio m/z range, from relatively higher mass to charge ratio m/z to relatively lower mass to charge ratio m/z as a function of time, from the first RF ion accumulation device via the first ion exit;

and wherein the controller is configured to control the power supplies the set of power supplies to move from the first configuration to the second configuration, for example repeatedly, in synchronization with storage of ions in the ion storage device and release of stored ions therefrom.

Additionally and/or alternatively, the apparatus comprises:

an RF ion accumulation device having an ion entrance, an ion exit and a first electrode, disposed at, proximal and/or adjacent to the ion exit;

an ion fragmentation device having an ion entrance and an ion exit, disposed downstream of the RF ion accumulation device;

a first power supply electrically coupled to the first electrode and configured to provide a first AC signal to the first electrode forming a first axial potential barrier at, proximal and/or adjacent to the ion exit of the RF ion accumulation device; and a controller configured to control the first power supply in:

a first configuration, wherein the amplitude of the AC signal forming the first axial potential barrier is substantially constant preventing exit of ions from the first RF ion accumulation device via the ion exit;

a second configuration, wherein the amplitude of the AC signal forming the first axial potential barrier is ramped permitting exit of the ions from the first RF ion accumulation device via the first ion exit in accordance with their mass-to-charge (m/z) ratio, such that the ions are released sequentially in order from higher m/z values to lower m/z values.

As described below in more detail, the array of RF ion accumulation devices operates at relatively low pressures, for example below 0.01 mbar, with little to no gas flow requirement, in contrast with TIMS, for example. The inventors have experimentally observed that ion activation leading to uncontrolled fragmentation in RF devices operated in the molecular flow regime is reduced at high space charge loads, compared with RF-devices operated at relatively higher pressures and/or in the viscous flow regime, thereby reducing background ions and/or unassignable noise in the spectra, which degrade S/N and/or dynamic range. In this way, S/N and/or dynamic range are improved, thereby enhancing profiling depth, for example.

As described below in more detail, the array of RF ion accumulation devices may be scaled, for example in series and/or in parallel by axial segmentation and/or radial duplication, resulting in even higher charge storage capacities while improving ion utilization efficiency, without the requirement of scaling pumping requirements, such as required by TIMS, because the array of RF ion accumulation devices operates at relatively low pressures, preferably below 0.1 mbar where the transitional flow is leaning toward the molecular flow regime depending on geometry.

As described below in more detail, a time-to-m/z correlation is maintained for the accumulated ions exiting the first RF ion accumulation device, enabling synchronous selection of the eluted (i.e. the exiting or ejected) ions by a selection quadrupole mass filter, for example. This corresponds with a time-to-mobility correlation maintained by TIMS, for example.

As described in more detail, the array of RF ion accumulation devices operates on a millisecond timescale (typically 10 s of ms, rather than 10 s of μs), compatible with quadrupole scanning methods and switching speeds. In this way, ions are not overlapped spatially (for example, as with AC ion ejection implemented into an orthogonal acceleration time-of-flight mass spectrometer), but instead separated both spatially and temporally, for example, for subsequent selection based on m/z and/or subsequent sequential fragmentation of ions in order from higher m/z values to lower m/z values.

While the array of RF ion accumulation devices operates at relatively low pressures, it should be understood that the array of RF ion accumulation devices operates in the gas phase (<1 mbar). Generally, ions are confined radially in the first RF ion accumulation device (for example by a RF confining field) and an axial electrical driving force (for example, an axial DC field or traveling wave) urges the ions axially from the first entrance towards and/or to the first exit (i.e. there exists and/or there is applied an electrically controllable driving force which drives net ion motion along the axis of the first RF ion accumulation device, more generally along the array of RF ion accumulation devices). At or proximal the first exit of the first RF ion accumulation device, a m/z or mass dependent pseudopotential provides a barrier (i.e. the first axial potential barrier, also known as an axial pseudopotential barrier) which confines or traps the accumulated ions axially in the first RF ion accumulation device, thereby preventing some or all of the accumulated ions from exiting the first exit. As this first axial potential barrier is reduced, for example over a duration of a few ms or over 10 s of ms, the accumulated ions exit the first RF ion accumulation device based on their respective m/z ratios, from relatively higher m/z to relatively lower m/z. Additionally and/or alternatively, the first aspect provides an apparatus for a mass spectrometer, the apparatus comprising:

- an RF ion accumulation device (e.g. the first RF ion accumulation device), operated at a first pressure, for receiving ions through an entrance end, accumulating ions therewithin and outputting ions through an exit end;
- a first terminal lens-electrode (e.g. the first electrode) disposed at the exit end of the RF ion accumulation device, connected to a first power source;
- optionally, an RF ion guide, operated at a third pressure, disposed downstream of the RF ion accumulation device (and/or of the first terminal lens-electrode) to receive ions exiting the RF ion accumulation device, configured to cool and/or thermalize the ions before mass filtering using a quadrupole mass filter, wherein respective parameters of the RF ion guide confining the ions radially therein are selected to match a phase acceptance of the quadrupole mass filter;
- optionally, a quadrupole mass filter, disposed downstream of the RF ion accumulation device and/or the optional RF ion guide, configured to filter at least a fraction of the ions exiting the RF ion accumulation device and/or the optional RF ion guide, wherein an isolation window of the quadrupole mass filter corresponds with the selected mass to charge ratios m/z of the ions exiting the RF ion accumulation device;
- an activation/dissociation device (e.g. the ion fragmentation device), operated at a second pressure, disposed downstream of the first terminal lens-electrode, the optional RF ion guide and/or the optional quadrupole mass filter, for receiving ions exiting the RF ion accumulation device, the optional RF ion guide and/or the optional quadrupole mass filter and configured to activate/dissociate the ions therein;
- optionally, a mass analyzer disposed downstream of the activation/dissociation device, the optional RF ion guide and/or the optional quadrupole mass filter, configured to measure respective mass to charge ratios m/z of the ions; and
- a controller, communicatively coupled to the first power source and configured to: during a first phase of operation (e.g. the first configuration), control the first power source to apply at least one voltage to the first terminal lens-electrode to prevent ions from exiting the RF ion accumulation device through the exit end; and, during a second phase of operation (e.g. the second configuration), control the first power source to change the at least one voltage applied to the first terminal lens-electrode to allow substantially all ions of selected mass to charge ratios m/z to exit the ion accumulation unit through the exit end sequentially from high to low m/z value. In use, a first force (i.e. an axial driving force) urges accumulating and/or accumulated ions towards the first exit whereupon a second force (i.e. the first axial potential barrier) pushes the urged ions back away from the first exit. One of the first or second forces is substantially more m/z dependent than the other such that the net force on the ions is m/z dependent. As described below in more detail, the first and second forces may be due to one or more of a DC electric field, and/or a travelling wave, for example.

In the first configuration, the first and second forces are initially set to prevent ions of a predetermined m/z range (i.e. the selected mass to charge ratio m/z range) from exiting the first RF ion accumulation device. Ions enter the first RF ion accumulation device via the first entrance, for example for a predetermined and/or a dynamically determined duration, for example from an ion source and/or an upstream ion trapping device. Due to collisions between the ions and gas molecules in the first RF ion accumulation device, the ions lose kinetic energy (i.e. thermalizing, collisional cooling). They ions are radially confined by an RF confining potential, for example, and axially confined at the first exit by the first axial potential barrier. An axial potential gradient and/or an optional repulsive potential or barrier at the first entrance, for example, prevents ions from reversing upstream through the first RF ion accumulation device. In this way, the ions become both axially and radially trapped (i.e. accumulate) in the first RF ion accumulation device. Optionally, the intensity of the axial field component is adjusted according to the number of charges trapped in the first RF ion accumulation device, with stronger fields preferably applied to improve confinement as the number of charges is increased.

In the second configuration, the accumulated ions exit the first RF ion accumulation device, for example wherein the accumulated ions are released (also known as eluted or ejected) in m/z order out of the first exit by decreasing (scanning down) the magnitude of the second force as a function of time and/or by increasing (scanning up) or by decreasing (scanning down) the magnitude of the first force as a function of time, depending on variations in the density of the ions across the m/z range trapped in the first accumulation device.

In one example, the scanning of the first or second force to elute ions from the ion volume is linear as a function of time. However, in alternate embodiments, the forces may be scanned as any function of time. For example, the amplitude of the AC waveform on the exit lens may be a quadratic or a square root or a non-linear function of time. The non-linear rate of change of the AC amplitude can be adjusted quickly based on the relative abundance of the ions present in the accumulation device. Alternatively, the amplitude of the AC waveform may be stepped abruptly from a first amplitude to a second in order to release ions of a selected m/z range simultaneously. The sequential release of the ions can be optimized and ions released at substantially the same AC amplitude, independently of the charge density in the first RF ion accumulation device that may vary over time, by dynamically controlling the first and second forces driving ions through the first exit and/or by dynamically controlling the DC bias of the AC signal.

Array of RF Ion Accumulation Devices

The apparatus comprises the array of RF ion accumulation devices, including the first RF ion accumulation device having the first ion entrance, the first ion exit and the first set of electrodes, including a first electrode, disposed at, proximal and/or adjacent to the first ion exit. It should be understood that the first RF ion accumulation device defines a first volume, for accumulation of ions therein. It should be understood that the first RF ion accumulation device has the first ion entrance, the first ion exit and the first set of electrodes. Similarly, an Nth RF ion accumulation device has an Nth ion entrance, an Nth ion exit and an Nth set of electrodes, for consistency.

In one example, the first RF ion accumulation device comprises and/or is a radio frequency, RF, ion guide configurable with a pair of controllable radio frequency signals for controlling ion motion radially and with a controllable potential profile along the axis of the ion guide for controlling ion motion axially.

In one example, the first RF ion accumulation device comprises and/or is a RF multipole ion guide, preferably a segmented RF multipole ion guide, and/or a RF stacked ring ion guide. By applying a RF potential to the multipoles of the RF multipole ion guide or the rings of a RF stacked ring ion guide, a ponderomotive force confines ions radially therein. By applying an axial DC field or potential gradient along the multipoles of the RF multipole ion guide (for example, using auxiliary RF-free electrodes (such as LINAC electrodes) and/or by applying respective DC potentials to respective segments) or by applying a travelling wave along the rings of a RF stacked ring ion guide, an axial driving force urges the ions axially. In one example, the RF multipole ion guide has an inscribed radii greater than or equal to 3 mm, preferably greater than or equal to 4 mm or even greater, to accommodate more ions.

In one example, the first RF ion accumulation device comprises and/or is a multipole ion guide, preferably a segmented multipole ion guide, for example a quadrupole, a hexapole, an octupole or any higher order high charge capacity multipole device, preferably a hexapole, an octupole or any higher order high charge capacity multipole device, more preferably an octupole or a dodecapole (12-pole), most preferably an octupole with a greater inscribed radius, for example $R_o$>3 mm, for high charge capacity.

In one example, the RF ion accumulation device comprises and/or consists of a single or multiple radio frequency ion guides arranged in parallel and/or in series, having respective first terminal lens-electrodes (for example, as described with respect to the first terminal lens-electrode mutatis mutandis), wherein the respective terminal lens-electrodes are disposed at the respective exit ends of the one or more radio frequency ion guides. In one example, the controller is communicatively coupled to respective first power sources and configured to: during respective first phases of operation, control the respective first power sources to apply respectively at least one voltage to the respective first terminal lens-electrode to prevent ions from exiting the respective ion guides; and, during respective second phases of operation, control the respective first power sources to change the respective at least one voltage applied to the respective first terminal lens-electrodes to allow substantially all ions of selected mass to charge ratios m/z to exit the respective ion guides through the respective exit ends sequentially. In one example, the RF ion accumulation device is adapted to be operated and/or is operated at a pressure below the ion mobility pressure regime, for example <1 mbar, preferably at approximately 0.05 mbar or lower for efficient ion thermalization (i.e. collisional cooling) and/or mass selective ejection. Additionally and/or alternatively, the RF ion accumulation device is adapted to be operated and/or is operated within a pressure regime where the effective (pseudopotential) theoretical description of RF ion trapping devices applies. The effective potential well approximation assumes that the RF-driven micromotion of ions is largely uninterrupted by collisions of the ions with neutral gas molecules. As gas pressure increases, frequent ion-neutral collisions disrupt this micromotion on the timescale of the RF drive, leading to stochastic motion. Once collisions occur often enough, ions no longer experience a well-defined restoring force enabling trapping in a localized region, with secular ion motion becoming ill-defined, and the standard RF ion-trap theory based on a stable effective potential breaking down.

The reduced operating pressure of <1 mbar, preferably <0.05 mbar, of the RF ion accumulation device contrasts with the relatively elevated pressures in TIMS, SLIM or other ion mobility devices employed for enhancing duty cycle. This reduced operating pressure leads to reduced RF heating and/or reduced ion activation/dissociation and/or fragmentation in the RF ion accumulation device, even at the relatively higher space charge loads enabled by the RF ion accumulation device compared with IMS, SLIM or other ion mobility devices employed for enhancing duty cycle. Reducing ion activation/dissociation and/or fragmentation is desirable to decrease the number of background ions, which further leads to enhanced signal-to-noise and higher dynamic range measurements. Reduced ion activation/dissociation and/or fragmentation in the RF ion accumulation device, even at the relatively higher space charge loads, can also be accomplished in a higher-order RF-multipole configuration.

In one example, the array of RF ion accumulation devices includes only the first RF ion accumulation device i.e. a single RF ion accumulation device. In one example, the array of RF ion accumulation devices includes N RF ion accumulation devices, including the first RF ion accumulation device, wherein N is a natural number greater than or equal to 2, for example 2, 3, 4, 5, 6, 7, 8, 9, 10, 20, 30, 40, 50, 100 or more. In one example, the Nth and/or each of the N RF ion accumulation devices is as described with respect to the first RF ion accumulation device, mutatis mutandis.

In one example, the N RF ion accumulation devices is provided by: a single or monolithic RF ion accumulation device, for example as N ion accumulation regions therein; separate or discrete RF ion accumulation devices; and/or combinations thereof.

In one example, the array of RF ion accumulation devices includes only the first RF ion accumulation device i.e. a single RF ion accumulation device, and is configured with an ion storage device or region for synchronized ion storage and transfer (without mass selective ejection) to the first RF ion accumulation device, to thereby perform parallel storage and accumulation, wherein the first RF ion accumulation device is disposed downstream of the ion storage device or region, for mass selective ejection of ions in order from higher m/z to lower m/z from the first RF ion accumulation device. Preferably, a segmented RF octupole or a segmented RF-dodecapole is configured with an ion storage region receiving ions from the ion source and cooling ions via collisions therein, and an ion accumulation region disposed downstream of the ion storage region further configured with an ion exit and a first electrode, disposed at, proximal and/or adjacent to the ion exit;

- a first power supply electrically coupled to the first electrode and configured to provide a first AC signal to the first electrode forming a first axial potential barrier at, proximal and/or adjacent to the ion exit of the ion accumulation region; and
- a controller configured to control the first power supply in:
- a first configuration, wherein the amplitude of the AC signal forming the first axial potential barrier is substantially constant preventing exit of ions from the ion accumulation region via the ion exit;
- a second configuration, wherein the amplitude of the AC signal forming the first axial potential barrier is ramped permitting exit of the ions from the ion accumulation region via the first ion exit in accordance with their mass-to-charge (m/z) ratio, such that the ions are released sequentially in order from higher m/z values to lower m/z values;
- and a parallel configuration wherein the ion storage region is storing ions during the application of the first and second configurations to the ion accumulation region and optionally, transferring the stored ions during the application of the first configuration to the ion accumulation region.

Series

In one example, the array of RF ion accumulation devices includes m RF ion accumulation devices, including the first RF ion accumulation device, disposed mutually in series, wherein m is a natural number less than or equal to N; optionally wherein the controller is configured to control the set of power supplies in the respective first configurations to dynamically provide respective amplitudes of the respective axial pseudo-potential barriers of the m RF ion accumulation devices. In this way, the m RF ion accumulation devices are provided mutually in series, thereby enabling increased ion accumulation capacity, enhanced mass selectivity during ejection, and/or hierarchical, time-structured successive ion release through the m RF ion accumulation devices, as described below in more detail. In one example, the m RF ion accumulation devices are mutually coaxial. In one example, the m RF ion accumulation devices are mutually disposed in series, wherein the first RF ion accumulation device is the most upstream RF ion accumulation device and the mth RF ion accumulation device is the most downstream RF ion accumulation device.

Additionally and/or alternatively, in one example, the apparatus comprises:

- a plurality of radio-frequency ion guide segments (i.e. RF ion accumulation devices) arranged coaxially and in series along a common longitudinal axis;
- a terminal lens-electrode (i.e. first electrode) disposed at the exit of each ion guide segment, each terminal lens-electrode being driven by an individually selectable AC signal that defines an AC potential barrier restraining ions within the corresponding ion guide segment during a first phase of operation;
- wherein the AC signal applied to each terminal lens-electrode has an amplitude selected such that ions entering the apparatus self-partition across the plurality of ion guide segments according to mass-to-charge ratio and accumulate behind segment-specific AC potential barriers;
- and a control system configured to, during a second phase of operation, sequentially ramp the AC signal amplitudes from higher to lower amplitude beginning with the terminal lens-electrode of the most downstream ion guide segment and proceeding upstream, thereby selectively releasing ions from each ion guide segment in order of decreasing mass-to-charge ratio.

In one example, the AC signal amplitude is ramped over a millisecond timescale between 1 and 1000 ms, and preferably between 5 and 250 ms.

In one example, ions stored in any upstream segment remain restrained behind their respective AC potential barriers until the downstream segment has completed its mass-selective release. In this way, the charge load received from the ion source is distributed over multiple segments and undesired space charge effects are effectively minimized.

In one example, the plurality of ion guide segments is operated at a pressure below 1 mbar, preferably below 0.1 mbar.

In one example, the apparatus comprises a fragmentation device downstream of the final ion guide segment, the fragmentation device being configured to receive ions released in a mass-ordered sequence.

In one example, the apparatus comprises a quadrupole mass filter disposed downstream of the ion processing apparatus and synchronized with the sequential AC-ramp release to transmit selected mass windows.

In one example, the ion guide segments comprise a stacked ring ion guide and/or a multipole ion guide such as quadrupole, hexapole, octupole, or higher-order multipole geometries such as a dodecapole. Preferably, the plurality of RF ion guide segments (i.e. RF ion accumulation devices) arranged coaxially and in series along a common longitudinal axis are further configured with an upstream entrance segment operated at approximately equal pressure or an upstream RF ion guide operated at a higher pressure for parallel ion accumulation (i.e. simultaneous storage and accumulation/release).

Parallel

In one example, the array of RF ion accumulation devices includes n RF ion accumulation devices, including the first RF ion accumulation device, disposed mutually in parallel, wherein n is a natural number less than or equal to N. In this way, the n RF ion accumulation devices are provided mutually in parallel, thereby enabling increased dynamic range, reduced space-charge-induced field distortion, and/or improved load-balanced operation in which no individual RF ion accumulation device approaches its storage capacity limit under high-flux ion-source conditions.

In one example, the n RF ion accumulation devices, disposed mutually in parallel, are disposed planarly (i.e. a 2D arrangement wherein an RF ion accumulation device has one or at most two mutually adjacent neighbours, for example for filling transversely) and/or non-planarly (i.e. a 3D arrangement wherein an RF ion accumulation device has two or more mutually adjacent neighbours, for example for filling using an ion funnel).

In one example, the n RF ion accumulation devices have a common, for example a single, set of electrodes and/or a common, for example a single, electrode disposed at, proximal and/or adjacent to the respective ion exits. In this way, the second configuration is simultaneous for the n RF ion accumulation devices.

Pre-Separator

Additionally and/or alternatively, in one example, the apparatus comprises:

- a radio-frequency/direct-current driven quadrupole pre-separator configured to receive an ion beam and to continuously eject ions laterally according to mass-to-charge ratio and/or according to ion mobility and/or m/z along the length of the quadrupole;
- a plurality of parallel ion-storage or ion-processing channels (i.e. array of RF ion accumulation devices) disposed to receive corresponding laterally ejected ion beamlets;
- and a control system configured to operate the quadrupole pre-separator such that the ion beam is partitioned into mass-dependent beamlets that are routed simultaneously into the parallel channels for independent accumulation, storage, activation, or analysis.

In one example, the quadrupole pre-separator comprises segmented DC electrodes that generate a spatially varying stability region for controlled m/z-dependent lateral ejection. In one example, switched DC electrodes are employed to generate DC gradients enabling redirection of ions according to ion mobility and/or according to m/z into the plurality of parallel ion-storage or ion-processing channels.

In one example, each parallel channel comprises an RF ion guide, multipole storage cell, or other ion-confinement structure having a terminal lens-electrode enabling m/z selective retention and release.

In one example, the tandem pre-separator sections are arranged sequentially to extend the m/z and/or mobility range over which ions are laterally ejected.

In one example, the quadrupole pre-separator is configured for real-time load balancing to mitigate space-charge congestion in any single downstream channel.

In one example, the lateral-ejection thresholds are dynamically adjusted based on ion-flux conditions, desired acquisition mode, or m/z-mobility-window targeting.

In one example, each parallel channel of the plurality of parallel ion-storage or ion-processing channels comprises a segmented RF ion guide, preferably an RF-octupole of a RF-dodecapole ion guide, configured with a parallel accumulation region for receiving ions from the ion source.

In one example, the pre-separator ion optical component comprises and/or consists of a quadrupole ion-guide operated <1 mbar pressure and supplied with RF potentials for radial confinement and further configured with a spatially varying axial DC potential profile established by segmentation of the quadrupole pole-electrodes or by embedded DC-only electrodes with a field component penetrating into the RF field. The combined RF/DC field produces a position-dependent stability condition such that ions of differing m/z values acquire controlled transverse excursions. At defined positions along the quadrupole ion-guide axis, these excursions exceed the radially confining pseudopotential field component, causing ions to be ejected laterally from the main propagation axis. Because the DC gradient, RF amplitude, and rod geometry are engineered to vary along the quadrupole length, ions of progressively increasing m/z are ejected at different longitudinal locations, thereby producing a set of mass-ordered lateral ion outlets with pre-determined m/z ranges that can be separately directed into the parallel multi-segment RF ion accumulation device.

In one example, the pre-separator ion optical component comprises and/or consists of an RF ion guide operated at >1 mbar pressure where the transverse ejection process is governed primarily by ion mobility. The DC component responsible for the transverse displacement of the ions can be uniform or vary along the length of the main propagation axis of the RF ion guide. Similarly, ions of progressively lower m/z and higher ion mobility are ejected at more distant longitudinal locations, thereby producing a set of mass and/or mobility-ordered lateral ion outlets with pre-determined m/z and mobility ranges that can be separately directed into the parallel multi-segment RF ion accumulation device.

In one example, each of the RF ion accumulation devices is configured with an ion funnel for receiving and focusing the transversely ejected ions from the >1 mbar pressure region of the pre-separator device into the desired operating pressure of the parallel-section ion processing unit where the AC field barrier is effective in releasing ions in a mass selective manner with high efficiency (<0.1 mbar).

In one example, each transversely ejected ion beamlet is directed into a corresponding parallel RF ion accumulation device (also known as an ion storage channel or a parallel processing cell) of the array of RF ion accumulation device. Each RF ion accumulation device may be implemented as an RF ion guide, segmented multipole, stacked ring, or other high-capacity confinement structure known in the art, and may be further equipped with a terminal lens-electrode capable of mass-selective retention and ejection as described for the coaxial configuration. By distributing ions across multiple parallel RF ion accumulation devices, the parallel configuration improves dynamic range, reduces space-charge-induced field distortion, and enables load-balanced operation in which no individual storage cell approaches its capacity limit under high-flux ion-source conditions.

In one example, each RF ion accumulation device is configured to mass-selectively release ions into an ion funnel (for example, a common or single ion funnel), configured to receive ions from all RF ion accumulation devices simultaneously and/or sequentially releasing ions, and further configured to focus and transmit these ions toward a quadrupole mass filter and/or toward a fragmentation device disposed further downstream.

Series & Parallel

In one example, the array of RF ion accumulation devices includes:

- m RF ion accumulation devices, including the first RF ion accumulation device, disposed mutually in series, wherein m is a natural number less than N; and
- n RF ion accumulation devices, including the first RF ion accumulation device, disposed mutually in parallel, wherein n is a natural number less than N;

optionally, wherein m×n=N.

In this way, the array of RF ion accumulation devices includes a plurality of two or more RF ion accumulation devices mutually in series that are disposed mutually in parallel.

In one example, the apparatus comprises a hybrid architecture combining a pre-separator ion optical component with downstream coaxial multi-segment storage cells, each configured with a parallel accumulation region for maximum capacity and duty cycle. The incoming ion beam is partitioned into multiple m/z-range resolved beamlets using the pre-separator ion optics and each beamlet is transferred into a parallel array of coaxial multi-segment ion guides, preferably transferred into a parallel array of parallel accumulation regions prior to subsequent transfer and mass selective ejection into downstream optics. This apparatus may be efficiently realized in PCB-based structures. The parallel array of coaxial storage channels receives mass-partitioned beamlets continuously, while each channel independently performs sequential AC-ramp ejection into a shared downstream mass analyzer and/or toward a fragmentation device.

Set of Electrodes

The first RF ion accumulation device has the first set of electrodes, including the first electrode, disposed at, proximal and/or adjacent to the first ion exit. The first power supply is electrically coupled to the first set of electrodes and configured to provide the first axial potential barrier (also known as a pseudopotential barrier) at, proximal and/or adjacent to the first ion exit, for example by applying an AC voltage to the first set of electrodes, such as to the first electrode. In one example, the first axial potential barrier defines the first exit. In one example, the first exit is defined by an aperture. In one example, the first electrode comprises and/or is a ring electrode, an apertured plate, or a skimmer-shaped electrode having an aperture therethrough, for example wherein an apex thereof is oriented towards the first end and/or the first entrance. Other electrode geometries are known. In one example, the first electrode comprises and/or is a terminal lens electrode. In one example, the first electrode is relatively more proximal the first end than a second electrode. In one example, the first electrode is disposed at or downstream of the first exit.

In one example, the first set of electrodes includes a second electrode, configured to attenuate penetration of the first axial potential barrier downstream thereof. In one example, the second electrode is disposed downstream of the first electrode and/or the first end. In one example, the second electrode comprises and/or is a ring electrode, an apertured plate, or a skimmer-shaped electrode having an aperture therethrough, preferably a skimmer-shaped electrode having an aperture therethrough, for example wherein an apex thereof is oriented towards the first electrode. In one example, the first electrode comprises and/or is a skimmer-shaped electrode having an aperture therethrough and the second electrode comprises and/or is a skimmer-shaped electrode having an aperture therethrough, for example wherein respective apexes of the first electrode and the second electrode are oriented towards the first end and/or the first entrance (e.g. mutually nested). In one example, an axial gap between the first electrode and the second electrode is in a range from 0.5 mm to 3 mm, preferably in a range from 1 mm to 2 mm. In one example, the apex of the first electrode protrudes into the first RF ion accumulation device via the first end thereof, for example by a distance in a range from 0.5 mm to 3 mm, preferably in a range from 1 mm to 2 mm.

In one example, the set of electrodes comprises one or more apertured, electrically conducting plates—ion len(es). Ions pass from the ion volume, through the aperture in the exit lens in order to exit the first RF ion accumulation device and/or the array of RF ion accumulation devices, for example to downstream optics, analyzers, and/or a detector. In one example, the set of electrodes provides a pumping restriction. For example, the set of electrodes may be directly or indirectly sealed against a wall of the vacuum chamber and conduct ions and/or gas only via an aperture therethrough. In one example, the set of electrodes comprises a multipole, a SRIG, and/or an ion funnel. In one example, the set of electrodes is configured to guide and/or focus ions out of the ion volume and to optional downstream optics, analyzers, or detectors. In one example, the set of electrodes is used to activate the ions, for example via collisions with inert gas or surfaces, or for conditioning the ions, for example by collisionally cooling and focusing the ions.

In one example, the set of electrodes consists of a single apertured plate, wherein forces on the accumulated ions are provided by applying both an attractive DC electrical potential and an AC electrical potential thereto. The AC electrical potential is of such amplitude and frequency so as to produce a repulsive pseudopotential such that ions in the m/z range of interest are initially retained in the volume. The force on the ions due to the DC electrical potential—i.e. the first force—is a function of only the charge on the ions and not their mass whereas the force on the ions due to the AC potential—i.e. the second force—is a function of the ions' mass-to-charge (m/z) ratio. Thus, the net force on the ions will be a function of their m/z. Thus, in one example, the DC and AC potentials on the first electrode are set to values that result in a net force which prevents the ions exiting the first RF ion accumulation device (i.e. the first configuration). The first RF ion accumulation device is allowed to fill with ions. Subsequently, the DC electrical potential on the first electrode is made to be progressively more attractive and/or the AC electrical potential is made to be progressively weaker such that ions elute according to m/z-highest m/z ions eluting first and lower m/z ions later in the scan (i.e. the second configuration).

Ion Fragmentation Device

The apparatus comprises the ion fragmentation device (or region) (also known as an activation/dissociation device or region) having an ion entrance and an ion exit, disposed mutually (directly) in series with the array of RF ion accumulation devices and wherein the ion fragmentation device is disposed downstream of the array of RF ion accumulation devices. In this way, accumulated ions within successively mutually different (for example partially overlapping or adjacent) selected mass to charge ratio m/z sub-ranges may successively exit the first accumulation device (more generally, the array of RF ion accumulation devices), in turn, for fragmentation in the ion fragmentation device. Hence, by at least partially separating the accumulated ions according to mass to charge ratio m/z, mixing of product ions in the fragmentation device is mitigated, thereby providing relatively more selective fragmentation of precursor ions.

In one example, the ion fragmentation device is disposed mutually directly in series with the array of RF ion accumulation devices, for example excluding other ion processing devices therebetween. Alternatively, in one example, the ion fragmentation device is disposed mutually indirectly in series with the array of RF ion accumulation devices, for example including one or more ion processing devices therebetween. Alternatively, in one example, the ion fragmentation device is substituted by one or more ion processing devices. That is, the ion fragmentation device is not essential.

In one example, the ion fragmentation device comprises and/or is a radio frequency ion guide configurable with a pair of controllable radio frequency signals for controlling ion motion radially and with a controllable potential profile along the axis of the ion guide for controlling ion motion axially.

In one example:

- the ion fragmentation device has a set of electrodes, including a first electrode, disposed at, proximal and/or adjacent to the ion exit;
- the set of power supplies includes a power supply electrically coupled to the set of electrodes and configured to provide an axial pseudo-potential barrier at, proximal and/or adjacent to the ion exit;
- the controller is arranged to control the set of power supplies in:
- a first arrangement, wherein the axial pseudo-potential barrier prevents exit of ions from the ion fragmentation device via the ion exit; and
- a second arrangement, wherein the axial pseudo-potential barrier permits exit of ions, within a selected mass to charge ratio m/z range, from the ion fragmentation device via the ion exit;
- optionally, wherein the controller is configured to control the set of power supplies in the first arrangement to decrease the axial pseudo-potential barrier to permit exit of ions, from relatively higher mass to charge ratio m/z to relatively lower mass to charge ratio m/z as a function of time, for example by ramping (linearly and/or non-linearly) and/or stepping (regularly and/or irregularly) the axial pseudo-potential barrier, for example during a duration in a range from 1 μs to 1000 μs, preferably in a range from 5 μs to 250 μs.

In one example, the apparatus comprises a second terminal lens-electrode disposed at the exit end of the activation/dissociation device, connected to a second power source. In one example, the controller is communicatively coupled to the second power source and configured to: during a third phase of operation, control the second power source to apply at least one voltage to the second terminal lens-electrode to prevent ions from exiting the activation/dissociation device through an exit end thereof; and, during a fourth phase of operation, control the second power source to change the at least one voltage applied to the second terminal lens-electrode to allow (substantially all) ions of selected mass to charge ratios m/z to exit the activation/dissociation device through the exit end thereof sequentially. In one example, the ions sequentially exiting the activation/dissociation device arrive at an extraction region of an orthogonal acceleration time-of-flight analyzer at substantially the same time and with substantially the same ion energy. In one example, the at least one voltage applied to the second terminal lens-electrode, to prevent ions from exiting the activation/dissociation device, comprises and/or is an AC voltage (also known as a signal) that is decreased (such as ramped and/or stepped), for example during the fourth phase of operation, from a relatively higher amplitude to a relatively lower amplitude, for example on a microsecond timescale (i.e. about 2-3 orders of magnitude faster than for first terminal lens-electrode), preferably with a duration between 1 and 1000 μs, and more preferably between 5 and 250 μs. In one example, the at least one voltage applied to the second terminal lens-electrode, to prevent ions from exiting the activation/dissociation device, comprises and/or is an AC voltage that is ramped from a relatively higher amplitude to a relatively lower amplitude, on a microsecond timescale, preferably with a duration between 1 and 1000 μs, and more preferably between 5 and 250 μs. In one example, the controller is configured control the power supply to apply multiple (for example, 10 s, 100 s or 1000 s or repeatedly) AC voltage ramps to the second terminal lens-electrode during (for example, throughout) the application of a single AC voltage ramp to the respective electrode of the respective ion accumulation devices.

In one example, the first and second phases of operation comprise a first scan performed with the RF ion accumulation device and the third and fourth phases of operation comprise a second scan performed with the activation/dissociation device, wherein the first scan performed with the RF ion accumulation device overlaps in time with two or more sequential second scans performed with the activation/dissociation device.

In one example, the fragmentation device comprises and/or is a RF ion guide configurable with a controllable potential profile along the axis of the ion guide for controlling ion motion axially and for releasing the ions towards a RF ion trapping device, further configured to eject ions into a time-of-flight mass analyzer.

Set of Power Supplies

The apparatus comprises the set of power supplies, including the first power supply electrically coupled to the first set of electrodes and configured to provide the first axial pseudo-potential barrier at, proximal and/or adjacent to the first ion exit. In one example, the first axial pseudo-potential barrier is provided between the set of RF ion accumulation devices and the ion fragmentation device, for example between the first RF ion accumulation device (for example, the first end) and the ion fragmentation device.

Axial Potential Barrier

The first power supply is electrically coupled to the first set of electrodes and configured to provide the first axial pseudo-potential barrier at, proximal and/or adjacent to the first ion exit. In one example, the first axial potential barrier is mass to charge ratio m/z dependent for example provided by first AC voltage, having an amplitude and a frequency, as described below.

In one example, the first power supply is electrically coupled to the first set of electrodes and configured to provide the first axial potential barrier at, proximal and/or adjacent to the first ion exit, by applying a first voltage, for example comprising an AC and/or a DC voltage, to the first set of electrodes, such as to the first electrode.

In one example, the first voltage comprises and/or is an AC voltage (also known as a signal) having an amplitude and a frequency, wherein the amplitude is decreased (such as ramped and/or stepped), for example during the second phase of operation, from a relatively higher amplitude to a relatively lower amplitude, for example on a millisecond timescale, preferably with a duration between 1 and 1000 ms, and more preferably between 5 and 250 ms. In one example, the first voltage comprises and/or is an AC voltage that is ramped from a relatively higher amplitude to a relatively lower amplitude, on a millisecond timescale, preferably with a duration between 1 and 1000 ms, and more preferably between 5 and 250 ms. In one example, the first voltage comprises a DC voltage (e.g. an offset voltage) compatible with a voltage gradient, for example, along the array of RF ion accumulation devices and/or downstream thereof.

In one example, the first axial pseudo-potential barrier is provided by one or more selected from a group consisting of: an AC signal applied to the first terminal-lens electrode (also known as an exit lens); an AC signal applied to electrodes surrounding the accumulation volume of the RF ion accumulation device; an AC signal applied to auxiliary RF-free electrodes (such as LINAC electrodes of the RF ion accumulation device i.e. separate from the rf electrodes of the trapping device).

Controller

The apparatus comprises the controller configured to control the set of power supplies in: the first configuration, wherein the first axial potential barrier prevents exit of ions, within a selected mass to charge ratio m/z range, from the first RF ion accumulation device via the first ion exit;

the second configuration, wherein the first axial potential barrier permits exit of the ions, within a selected mass to charge ratio m/z sub-range of the selected mass to charge ratio m/z range, from the first RF ion accumulation device via the first ion exit.

In one example, the controller is configured to control the power supplies the set of power supplies to move from the first configuration to the second configuration, for example repeatedly, in synchronization with storage of ions in the ion storage device and release of stored ions therefrom. In this way, storage and release of ions in the ion storage device is performed in parallel (i.e. simultaneously) with accumulation and m/z ordered release of ions from the array of ion accumulation devices, thereby increasing ion utilization efficiency or duty cycle, for example to 100%. In this way, a 100% duty cycle may be achieved by controlling a storage time in the ion storage device to be the same as the cycle time of the array of RF ion accumulation devices, as described herein.

First Configuration

In the first configuration, the first axial potential barrier prevents exit of ions, within the selected mass to charge ratio m/z range, from the first RF ion accumulation device via the first ion exit. It should be understood that the first axial potential barrier, for example an amplitude of the first AC voltage, defines the selected mass to charge ratio m/z range. For example, the amplitude of the first AC voltage may define the upper limit of the selected mass to charge ratio m/z range while the lower limit thereof is or tends to zero. In this way, all ions may be accumulated, for example wherein the amplitude of the first AC voltage is sufficiently high to confine all ions. Alternatively, the amplitude of the first AC voltage may be relatively lower, to allow relatively higher mass to charge ratio m/z ions to partition over the first axial potential barrier to downstream RF ion accumulation devices, for example.

It should be understood that the first configuration comprises and/or is an accumulation period, during which ions are accumulated in the array of RF ion accumulation devices.

In one example, the controller is configured to control the set of power supplies in the first configuration to provide a constant or substantially constant amplitude and/or frequency of the first AC voltage (i.e. the amplitude and/or the frequency of the first AC voltage is constant or substantially constant as a function of time in the first configuration).

In one example, the controller is configured to control the set of power supplies in the first configuration for a duration in a range from 1 ms to 1000 ms, preferably in a range from 5 ms to 250 ms.

In one example, the controller is configured to control the set of power supplies in the respective first configurations to provide monotonically increasing respective amplitudes of the respective axial pseudo-potential barriers of the m RF ion accumulation devices, disposed mutually in series. In this way, ions are partitioned between the m RF ion accumulation devices, wherein ions having relatively lower mass to charge ratio m/z accumulate in the first RF ion accumulation device due to the relatively higher amplitude of the first axial potential barrier and wherein ions having relatively higher mass to charge ratio m/z accumulate in the mth RF ion accumulation device due to the relatively lower amplitude of the (m−1)th axial potential barrier. In this way, a higher charge storage capacity is provided while improving ion utilization efficiency, as described previously.

In one example, the controller is configured to control the set of power supplies in the respective first configurations to dynamically provide respective amplitudes of the respective axial pseudo-potential barriers of the N RF ion accumulation devices. In this way, storage capacity may be optimised, for example based on a distribution of mass to charge ratios m/z of the ion flux.

Second Configuration

It should be understood that the second configuration comprises and/or is a release period (for example having an initial state, a final state and an intermediary state therebetween), during which ions are released from the array of RF ion accumulation devices, from relatively higher mass to charge ratio m/z (for example, at the initial state) to relatively lower mass to charge ratio m/z (for example, at the final state) as a function of time.

In one example, the controller is configured to control the set of power supplies in the second configuration to provide a decreasing amplitude of the first AC voltage (i.e. the amplitude of the first AC voltage decreases as a function of time in the second configuration).

In one example, the controller is configured to control the set of power supplies in the second configuration to provide a constant or substantially constant frequency of the first AC voltage (i.e. the frequency of the first AC voltage is constant or substantially constant as a function of time in the second configuration).

In one example, the controller is configured to control the set of power supplies in the second configuration for a duration in a range from 1 ms to 1000 ms, preferably in a range from 5 ms to 250 ms.

In one example, the controller is configured to control the set of power supplies in the second configuration to decrease the first axial pseudo-potential barrier to permit exit of ions, for example by ramping (for example, linearly and/or non-linearly) and/or stepping (for example, regularly and/or irregularly) the first axial pseudo-potential barrier, for example during a duration in a range from 1 ms to 1000 ms, preferably in a range from 5 ms to 250 ms. In this way, ions having successive and/or sequential selected mass to charge ratio m/z sub-range of the selected mass to charge ratio m/z range exit the first RF ion accumulation device successively and/or sequentially. In other words, as the first axial pseudo-potential barrier decreases, ions accumulated therebehind are released from relatively higher to relatively lower mass to charge ratio m/z, resulting in a mass-ordered ion flux transmitted downstream, for example towards the ion fragmentation device.

In one example, the controller is configured to control the set of power supplies in the second configuration to control, for example change, the frequency, the amplitude and/or the waveform (for example sinusoidal or non-sinusoidal such as rectangular) of the AC signal applied to the first exit electrode.

In one example, the controller is configured to control the set of power supplies in the second configuration to release the accumulated ions sequentially, from relatively higher to relatively lower mass to charge ratio m/z, without spatially and/or temporally focusing the released ions and/or while maintaining and/or preserving spatial and/or temporal axial distribution of the released ions, whereby the released ions arrive at the fragmentation device substantially sequentially, from relatively higher to relatively lower mass to charge ratio m/z.

Moving Between Configurations

In one example, the controller is configured to control the set of power supplies to move repeatedly between the first configuration and the second configuration, for example continuously, intermittently, periodically or aperiodically, for example according to a predetermined and/or a dynamically determined accumulated charge capacity threshold and/or ion flux.

In one example, the controller is configured to control the set of power supplies to move from the respective first configurations to the respective second configurations in reverse sequence, for example wherein the array of RF ion accumulation devices includes m RF ion accumulation devices, including the first RF ion accumulation device, disposed mutually in series, whereby the controller is configured to control the set of power supplies to move the mth RF ion accumulation device from the respective first configuration to the respective second configuration, followed by the (m−1)th RF ion accumulation device, thereby eliminating or avoiding mixing of the exiting ions from the respective RF ion accumulation devices. For example, the mth RF ion accumulation device is moved from the first configuration to the second configuration while the first to (m−1)th RF ion accumulation devices are maintained in the first configuration. Subsequently, upon reaching a final state of the second configuration, the (m−1)th RF ion accumulation device is moved from the first configuration to the second configuration while the first to (m−2)th RF ion accumulation devices are maintained in the first configuration and the mth RF ion accumulation device is maintained in the final state of the second configuration.

Axial Driving Force

In one example, the apparatus comprises a first axial driving force means, configured to urge ions from the first ion entrance towards the first ion exit;

- optionally, wherein the first axial driving force means comprises and/or is provided by: a DC voltage gradient; and/or a travelling wave. It should be understood that an axial gas flow (for example, an inherent axial gas flow due to differential pressures) and/or space charge (i.e. Coulombic forces for example, inherent space charge due to accumulation of ions) may additionally and/or alternatively provide, at least in part, an axial driving force and/or an opposing axial driving force.

In one example, the first axial driving force is provided by a DC voltage gradient. In one example, the controller is configured to control, for example dynamically control, the DC voltage gradient, such as to account for space-charge dependence on the first AC voltage. In one example, the first axial driving force is provided by a travelling wave. In one example, the controller is configured to control, for example dynamically control, an amplitude and/or a speed of the travelling wave, such as to account for space-charge dependence on the first AC voltage. For example, the ion flux may vary and hence space charge effect may vary such that the AC voltage is space charge dependent. That is, it may not be the same AC elution voltage for ions of the same m/z at different times due to different ion fluxes and hence different loadings of the RF ion accumulation device. By dynamically controlling the DC voltage gradient and/or the travelling wave to account for space-charge dependence on AC elution voltage, the space charge dependence may be accounted for. In this way, drift in the elution voltage (i.e. first AC voltage) for any given m/z, which is caused by variations in space charge from scan to scan, may be accounted for. For example, a DC potential on LINAC electrodes may be controlled so as to keep the net axial force, pushing the ions toward the exit, constant. That is, for a small number (e.g. 1E4) of charges stored the LINAC potential would be greater (e.g. 40 V) and for a large number (e.g. 5E7) of stored charges, the LINAC DC potential would be set lower (e.g. 25 V) in order to keep the net force on the ions constant. This is important to the mass calibration—i.e. the association of which m/z ions elute at which AC potential on the exit lens. This amounts to a method of dealing with the variation of the analytically useful ion current from the source which occurs during the course of some experiments—for example LCMS experiments. As the source current changes, the calibration of the proposed device would change unless, for example, the axial force is compensated using the LINAC DC potential gradient. Additionally and/or alternatively, space charge load may be controlled using an upstream deflector and survey scan information, as described below. In one example, the controller is configured to control the AC voltage non-linearly, for example non-linear ramping and/or non-linear stepping, to account for space-charge dependence on AC elution voltage, whereby ions of the same m/z elute at the same AC elution voltage, independent of space-charge. In one example, the ion flux is determined by acquiring a MS1 survey scan (i.e. without ion accumulation) to determine ion flux and then controlling the DC voltage gradient and/or the travelling wave in a subsequent scan, for example a MS2 scan, based on the determined ion flux from the MS1 survey scan.

In one example, the apparatus comprises means to control space charge, for example in the array of RF ion accumulation devices, includes switching the DC signal applied to a gate lens electrode between a transmission state and a deflection state thereby accumulating approximately the same number of charges in consecutive scans In one example, as described below in more detail, the apparatus comprises an upstream ion storage region (which may be part of the same array of RF ion accumulation devices operated at the same pressure or a separate upstream ion storage device operated at a different pressure) to store ions from the ion source, when the array of RF ion accumulation devices is configured in the second configuration (for example, during the AC ramping cycle).

In one example, the first axial driving force means comprises and/or is provided by one or more selected from a group consisting of: a DC voltage gradient such as DC voltage gradient applied via segmented ion optics (e.g. a segmented quadrupole) and/or DC voltage gradient applied via LINAC (angled) type electrodes a travelling wave (T-Wave) such as provided by a time-dependent DC and/or provided by a time-dependent change in RF phasing and/or duty cycle. In one preferred example, the first axial driving force means comprises and/or is provided by one or more selected from a group consisting of: a DC voltage gradient such as DC voltage gradient applied via segmented ion optics (e.g. a segmented quadrupole) and/or DC voltage gradient applied via LINAC (angled) type electrodes. In one example, an axial gas flow, a gas pressure gradient and/or difference, and/or space charge provide an inherent (i.e. in use, background) axial driving force, for example in addition to, for example, a DC voltage gradient, an RF amplitude gradient and/or a travelling wave. In one example, the controller is configured to control, for example dynamically, the first axial driving force means, for example a DC voltage gradient and/or a travelling wave, to account for an inherent axial driving force, for example as described below.

Ion Storage Device

In one example, the apparatus comprises an ion storage device, disposed upstream of the array of RF ion accumulation devices, configured to store ions, for example from the continuous ion flux from the ion source, for example when the array of RF ion accumulation devices is configured in the respective first configurations and/or second configurations. In one example, the ion storage device is configured to transfer the stored ions to the array of RF ion accumulation devices, for example when the array of RF ion accumulation devices is configured in the respective first configurations and/or when the first RF ion accumulation device is configured in the first configuration. In one example, the ion storage device comprises a first electrode, configured to provide an axial potential barrier at, proximal and/or adjacent to the ion exit thereof, to control storage of ions therein and release of stored ions therefrom, to the array of RF ion accumulation devices. In this way, ions from the continuous ion flux may be stored in the ion storage device while the array of RF ion accumulation devices is configured in the respective second configurations, optionally in the respective first configuration and/or moving therebetween, thereby increasing ion utilization efficiency (also known as duty cycle) towards 100%. In other words, ions from the continuous ion source are stored and released from the ion storage device into the first RF ion accumulation device (i.e. synchronously transferred to the first RF ion accumulation device). This store and release is performed in synchronization—in parallel—to the analysis of ions from the first RF ion accumulation device. For example, a group of ions is stored in the ion storage device while simultaneously, an earlier accumulated group of ions is accumulated and released in m/z order from the first RF ion accumulation device. Once the group of ions in the first RF ion accumulation device has been released in m/z order by, for example, scanning down the exit AC potential, the first RF ion accumulation device potentials are returned to accumulating potentials and the newly stored group of ions in the ion storage device is transferred into the first RF ion accumulation device. By this approach, it is possible to achieve 100%, or near 100% duty cycle.

In this way, a 100% duty cycle may be achieved by controlling a storage time in the ion storage device to be the same as the cycle time of the array of RF ion accumulation devices. It should be understood that the cycle time includes the first configuration (for example, wherein the amplitude of the AC signal forming the first axial potential barrier is substantially constant) and the second configuration (for example, wherein the amplitude of the AC signal forming the first axial potential barrier is ramped permitting exit of the ions).

In one example, the ion storage device and the array of RF ion accumulation devices are provided by respective regions (or segments) of a segmented RF multipole ion guide and/or a RF stacked ring ion guide, for example a single or a monolithic segmented RF multipole ion guide and/or a RF stacked ring ion guide, for example as described with respect to the array of RF ion accumulation devices mutatis mutandis.

Manifold

In one example, the apparatus comprises a set of ion manifold devices, including a first ion manifold device, configured to guide ions into and/or out of the respective RF ion accumulation devices of the array thereof;

optionally, wherein the first ion manifold device comprises an ion ejector and/or an ion funnel.

Ion Guide

In one example, the apparatus comprises an ion guide, having an ion entrance and an ion exit, disposed mutually in series with the array of RF ion accumulation devices and wherein the ion guide is disposed downstream of the array of RF ion accumulation devices.

In one example, the ion guide is configured to condition the ions. Beam conditioning, including collisional cooling and/or thermalization, is advantageous for efficient mass selection using a quadrupole mass filter of ions released sequentially based on a ramped AC signal applied to the exit lens of the array of accumulation devices, for example.

In one example, the ion guide is configured to thermalize and/or radially focus ions ejected from the array of RF ion accumulation devices.

In one example, the ion guide comprises and/or is a quadrupole ion guide, for example wherein a Q value of the quadrupole ion guide is configured to match a Q value of a downstream quadrupole mass filter. In this way, the ion guide conditions the beam (i.e. beam conditioning), thereby controlling phase space of the ions transmitted downstream towards a quadrupole mass filter, for example.

In one example, the ion guide is operated at the same pressure as the array of ion accumulation devices. In one example, the ion guide is operated at a relatively lower pressure compared with the array of ion accumulation devices, for example wherein the apparatus comprises a quadrupole mass filter which is operated at relatively lower pressure, for example $<1\times10^{-4}$ mbar.

Quadrupole Mass Filter

In one example, the apparatus comprises a quadrupole mass filter, having an ion entrance and an ion exit, disposed mutually in series with the array of RF ion accumulation devices and wherein the quadrupole mass filter is disposed downstream of the array of RF ion accumulation devices;

wherein the quadrupole mass filter is configured to filter at least a fraction of the ions exiting the array of RF ion accumulation devices, from relatively higher mass to charge ratio m/z to relatively lower mass to charge ratio m/z as a function of time, wherein an isolation window (also known as a Q window) of the quadrupole mass filter corresponds with a selected mass to charge ratio m/z sub-range of the ions exiting the array of RF ion accumulation devices. In this way, the ions that successively exit the array of RF ion accumulation devices, in order from relatively higher mass to charge ratio m/z to relatively lower mass to charge ratio m/z as a function of time, are received in the same order by the quadrupole mass filter. Hence, the temporal and/or spatial separation of these ions is maintained upon entering the quadrupole mass filter, such that these ions may be selectively mass filtered, according to their respective mass to charge ratio m/z, thereby improving selectivity and/or efficiency of mass filtering.

In one example, the apparatus comprises a quadrupole mass filter, disposed between the array of RF ion accumulation devices and the fragmentation device, configured to filter at least a fraction of the ions exiting the array of RF ion accumulation devices and entering the fragmentation device, for example wherein an isolation window of the quadrupole mass filter corresponds with the selected mass to charge ratios m/z of the ions exiting the array of RF ion accumulation devices.

Integration with Downstream m/z Selective Devices

In one example, a quadrupole mass filter is disposed downstream of the array of ion accumulation units. The quadrupole mass filter is synchronized with the sequential AC-ramp ejection such that the quadrupole mass filter transmits defined m/z windows of the fraction currently being released from a given ion accumulation unit. Segment-specific m/z windows may be defined for the quadrupole mass filter corresponding with the AC amplitudes for each respective first electrode. By coordinating these windows with the quadrupole mass filter's isolation settings, data-independent acquisition (DIA) workflows, for example, are facilitated, such as for bottom-up proteomics.

The AC-controlled m/z ranges for each ion accumulation unit, in combination with the quadrupole mass filter's m/z-selective transmission, allow specific sampling and/or fragmenting from broad, continuous m/z ranges in a highly synchronized and duty-cycle-optimized manner. Adjusting the AC amplitudes therefore provides a controllable mechanism for tuning or optimizing RF ion accumulation device capacity, DIA window widths, and/or ion-flux balancing across the array of RF ion accumulation devices.

Entrance Ion Optical Device

In one example, the apparatus, for example the array of RF ion accumulation devices, comprises an entrance ion optical device, for example comprising one or more apertured, electrically conducting plates—and/or ion lens(es), upstream (for example, directly upstream) of the first ion entrance. In this way, ions may be guided and/or focused into the array of RF ion accumulation devices and/or retained therein. For example, ions pass from an upstream ion source, and optional upstream ion optics, through the entrance ion optical device, in order to enter the first RF ion accumulation device. In one example, the entrance ion optical device is biased, during operation, at a relatively repulsive potential to prevent ions from exiting the array of RF ion accumulation devices therethrough. In one example, the entrance ion optical device provides a pumping restriction. For example, the entrance ion optical device may be directly or indirectly sealed against a wall of the vacuum chamber and conduct ions and gas only via an aperture therethrough. In one example, the entrance ion optical device comprises and/or is a multipole, a SRIG, and/or an ion funnel. In one example, the set of power supplies comprises a power supply configured to supply, AC, RF and/or DC potentials to the entrance ion optical device.

Upstream Ion Optics

In one example, the apparatus comprises upstream ion optics (i.e. upstream of the array of RF ion accumulation devices and/or an entrance ion optical device), for example one or more of an Einsel lens, a multipole or a SRIG ion guide, an ion trap, or ion funnel, or any other known prior art ion optic. In one example, the apparatus comprises one or more upstream analyzers, for example one or more of a mass analyzer (such as a quadrupole mass filter), a mobility analyzer, or mass-mobility analyzer (such as a "mobility filter" according to co-pending application EP 25 224 633.5). Mobility analyzers include "Drift Tube Ion Mobility Spectrometer" (DTIMS), Travelling Wave Ion Mobility Spectrometry (TWIMS), Trapped Ion Mobility Spectrometry (TIMS), Field Asymmetric Ion Mobility Spectrometry (FAIMS), or any other known type of mobility analyzer. Further, upstream techniques may include ion fragmentation, unfolding, charge reduction, or any other known prior art technique.

Downstream Ion Optical Device

In one example, exit of the ions, based on their respective m/z ratios, from the array of RF ion accumulation devices, is synchronized with a downstream ion optical device, for example an activation/dissociation device for fragmentation, beam conditioning, and/or ion injection to a mass analyzer.

In one example, the downstream ion optical device comprises and/or is one or more of an Einsel lens, multipole or SRIG ion guide, ion trap (such as an "mniTrap"), an ion funnel, a collision cell, an ion processor or any other known prior art ion optic. Downstream analyzers may optionally include one or more of a mass or mobility analyzer. Mass analyzers may include a Quadrupole mass filter (Q), a Time-Of-Flight Mass Spectrometer (TOFMS), a Fourier Transform Mass Spectrometer (FTMS), or any other known prior art mass analyzer. Mobility analyzers may include DTIMS, TWIMS, TIMS, FAIMS, or any other known type of mobility analyzer. Further, downstream techniques may include ion fragmentation, unfolding, charge reduction, or any other known prior art technique. Ion fragmentation may be performed via Electron based Dissociation methods (ExD), Collision Induced Dissociation (CID), Surface Induced Dissociation (SID), Photodissociation (PD) or any other known prior art fragmentation technique. Preferably a detector and detection system is included downstream from the array of RF ion accumulation devices for detection and recording of ions eluted from the array of RF ion accumulation devices or their products.

Ion Source

In one example, the apparatus comprises an ion source, for example an Electrospray Ionization (ESI) ion source, a Matrix Assisted Laser Desorption Ionization (MALDI) ion source, an Atmospheric Pressure Chemical Ionization (APCI) ion source, a "Direct Analysis in Real Time" (DART) ion source, an Electron Ionization/Chemical Ionization (EI/CI) ion source, or any other known ion source. The ion source may be operated at atmospheric or elevated pressure or may be in vacuum.

Vacuum Chamber

The second aspect provides a method of mass spectrometry, the method comprising:

- introducing ions into an array of RF ion accumulation devices, including a first RF ion accumulation device (or region) having a first ion entrance and a first ion exit;
- preventing exit of the ions, within a selected mass to charge ratio m/z range, from the first RF ion accumulation device (or region) via the first ion exit by providing a first axial pseudo-potential barrier at, proximal and/or adjacent to the first ion exit;
- permitting exit of the ions, within a selected mass to charge ratio m/z sub-range of the selected mass to charge ratio m/z range, from the first RF ion accumulation device (or region) via the first ion exit by controlling the first axial pseudo-potential barrier; and
- fragmenting the exiting ions, within the selected mass to charge ratio m/z sub-range of the selected mass to charge ratio m/z range, in an ion fragmentation device, having an ion entrance and an ion exit.

The method according to the second aspect may include any step described with respect to the apparatus according to the first aspect. Vice versa, the apparatus according to the first aspect may be configured to implement any step described with respect to the method according to the second aspect.

In one example, the method comprises operating the first RF ion accumulation device at a pressure below the ion mobility pressure regime, for example <1 mbar, preferably 0.05 mbar or lower.

In one example, controlling the first axial pseudo-potential barrier comprises decreasing the first axial pseudo-potential barrier, for example by ramping (linearly and/or non-linearly) and/or stepping (regularly and/or irregularly) the first axial pseudo-potential barrier, for example during a duration in a range from 1 ms to 1000 ms, preferably in a range from 5 ms to 250 ms.

In one example, the method comprises:

- preventing exit of the fragmented ions, within a selected mass to charge ratio m/z range, from the ion fragmentation device via the ion exit by providing an axial pseudo-potential barrier at, proximal and/or adjacent to the ion exit;
- permitting exit of the fragmented ions, within a selected mass to charge ratio m/z sub-range of the selected mass to charge ratio m/z range, from the ion fragmentation device via the ion exit by controlling the axial pseudo-potential barrier;
- wherein controlling the axial pseudo-potential barrier comprises decreasing the axial pseudo-potential barrier, for example by ramping (linearly and/or non-linearly) and/or stepping (regularly and/or irregularly) the axial pseudo-potential barrier, for example during a duration in a range from 1 μs to 1000 μs, preferably in a range from 5 μs to 250 μs.

Notes

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

Generally, like reference signs in the drawings refer to like features, description of which is omitted for brevity.

FIG. 1 schematically depicts an apparatus 1 according to an exemplary embodiment.

The apparatus 1 comprises:

- an array of RF ion accumulation devices 11, including a first RF ion accumulation device 11A having a first ion entrance 11A1, a first ion exit 11A2 and a first set of electrodes 11A3, including a first electrode 11A3A, disposed at, proximal and/or adjacent to the first ion exit 11A2;
- an ion fragmentation device 12 having an ion entrance 121 and an ion exit 122, disposed mutually in series with the array of RF ion accumulation devices 11 and wherein the ion fragmentation device 12 is disposed downstream of the array of RF ion accumulation devices 11;
- a set of power supplies 13, including a first power supply 13A electrically coupled to the first set of electrodes 11A3 and configured to provide a first axial potential barrier at, proximal and/or adjacent to the first ion exit; and
- a controller 14 configured to control the set of power supplies in:
- a first configuration, wherein the first axial potential barrier prevents exit of ions, within a selected mass to charge ratio m/z range, from the first RF ion accumulation device 11A via the first ion exit 11A2;
- a second configuration, wherein the first axial potential barrier permits exit of the ions, within a selected mass to charge ratio m/z sub-range of the selected mass to charge ratio m/z range, from the first RF ion accumulation device 11A via the first ion exit 11A2.

In this example, the first RF ion accumulation device 11A comprises and/or is a RF multipole ion guide, preferably a segmented RF multipole ion guide, particularly an RF octupole ion guide, preferably a segmented RF octupole ion guide.

Figure 2:
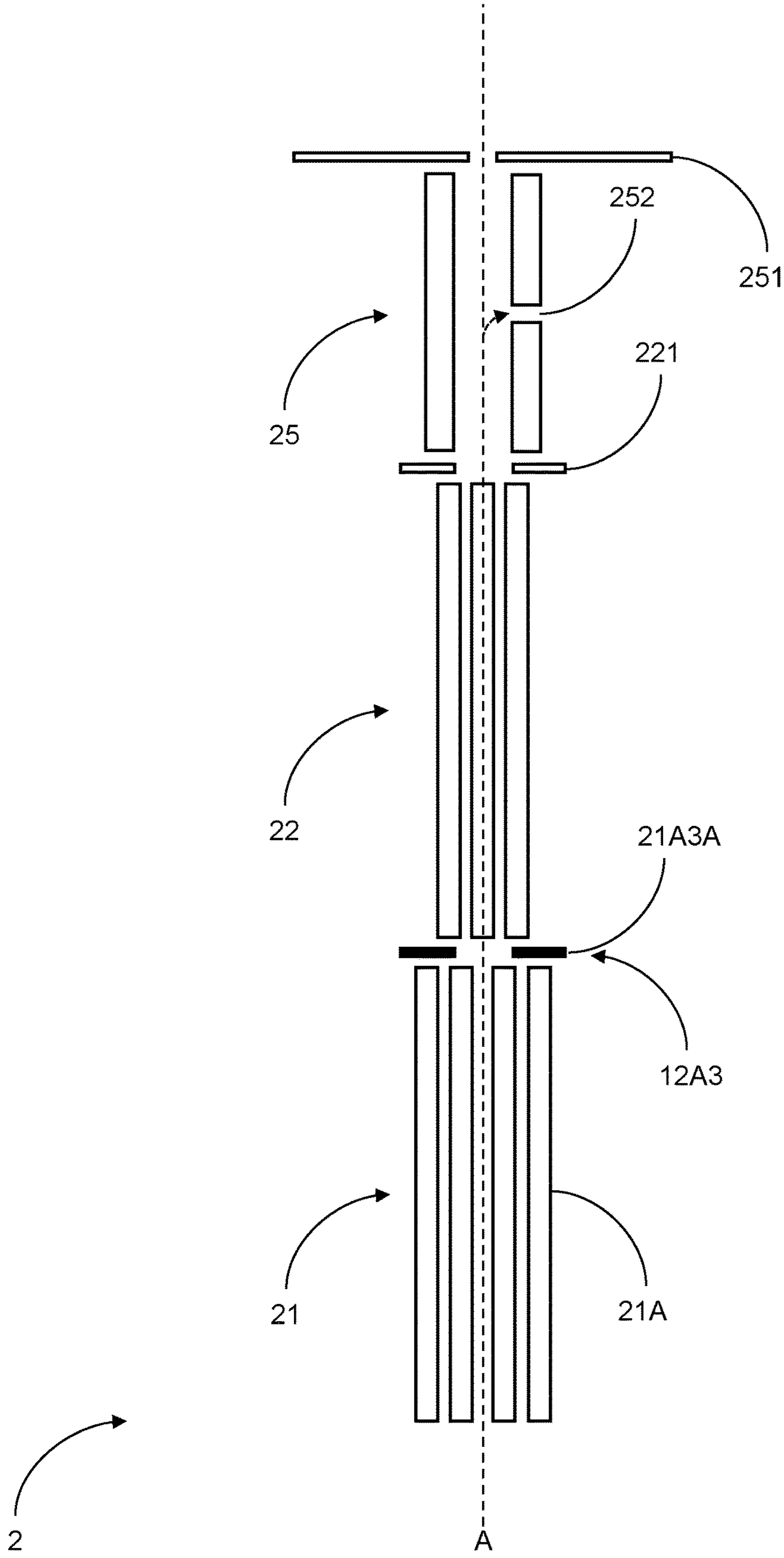
FIG. 2 schematically depicts an apparatus according to an exemplary embodiment.

FIG. 2 schematically depicts an apparatus 2 according to an exemplary embodiment, in more detail. The apparatus 2 is generally as described with respect to the apparatus 1 mutatis mutandis.

In this example, the apparatus 2 comprises a quadrupole mass filter 25. In this example, the quadrupole mass filter 25, having an ion entrance and an ion exit, is disposed mutually in series with the array of RF ion accumulation devices 21 and wherein the quadrupole mass filter 25 is disposed downstream of the array of RF ion accumulation devices 21; wherein the quadrupole mass filter 25 is configured to filter and/or to generate a mass spectrum of at least a fraction of the ions exiting the array of RF ion accumulation devices 21 and/or to filter and/or to generate a mass spectrum of at least a fraction of the fragment ions generated in the fragmentation device 22, In this example, an isolation window (also known as a Q window) of the quadrupole mass filter 25 corresponds with a selected mass to charge ratio m/z sub-range of the ions exiting the array of RF ion accumulation devices 21. In one example, the quadrupole mass filter 25 is synchronized with the sequential AC-ramp release of the first RF ion accumulation device 21A, to transmit selected mass windows.

In another example, the apparatus 2 comprises an orthogonal acceleration region 25 for pulsing ions into a time-of-flight mass analyzer through at least one electrode configured with an opening 252, wherein the opening is one of a narrow slit, a rectangular slot, for example, a slot with dimensions of 1.5 mm×30 mm or 2.5 mm×50 mm, or a wider opening covered by parallel thin wires with sub-mm spacing running along the A-axis direction. In this example, the ion fragmentation device 22 of apparatus 2 is configured with electrode 221, adjacent to the ion exit, with a controller and a power supply electrically coupled to electrode 221 further configured to provide an axial potential barrier at, proximal and/or adjacent to the ion exit of the fragmentation device 22, wherein in a first arrangement the axial potential barrier prevents exit of ions from the ion fragmentation device 22 via the ion exit, and wherein in a second arrangement the axial potential barrier permits exit of ions, within a selected mass to charge ratio m/z range, from the ion fragmentation 22 device via the ion exit, wherein the controller is configured to control the power supply in the first arrangement to maintain the amplitude of an AC signal applied to electrode 221 constant and in the second arrangement to decrease the amplitude of the AC signal thus to lower the axial potential barrier to permit exit of ions, for example by ramping and/or stepping the amplitude of the AC signal, for example during a duration in a range from 1 us to 1000 μs, preferably in a range from 5 μs to 250 μs, such that the changing of the axial potential barrier via decreasing the amplitude of an AC signal applied to electrode 221, is executed such that substantially all ions exiting the fragmentation device 22 sequentially obtain, upon exiting, substantially the same kinetic energy and reside in the orthogonal acceleration region 25 of the time-of-flight mass analyzer at substantially the same time.

In yet another example, the apparatus 2 comprises a linear ion trap 25 for pulsing ions into a time-of-flight mass analyzer through at least one opening 252 on one of the pole-electrodes, for example, on one of the pole electrodes of a linear ion trap supplied with a pair of antiphase RF signals for confining ions radially, wherein the opening is one of a narrow slit or a rectangular slot, for example, a slot with dimensions of 1 mm×20 mm or 2 mm×30 mm. The time-of-flight mass disclosed with reference to FIG. 2 is equipped with one or more reflectrons or ion mirrors and operated under high vacuum conditions, preferably at $1\times10^{-7}$ mbar pressure or lower.

Figure 3:
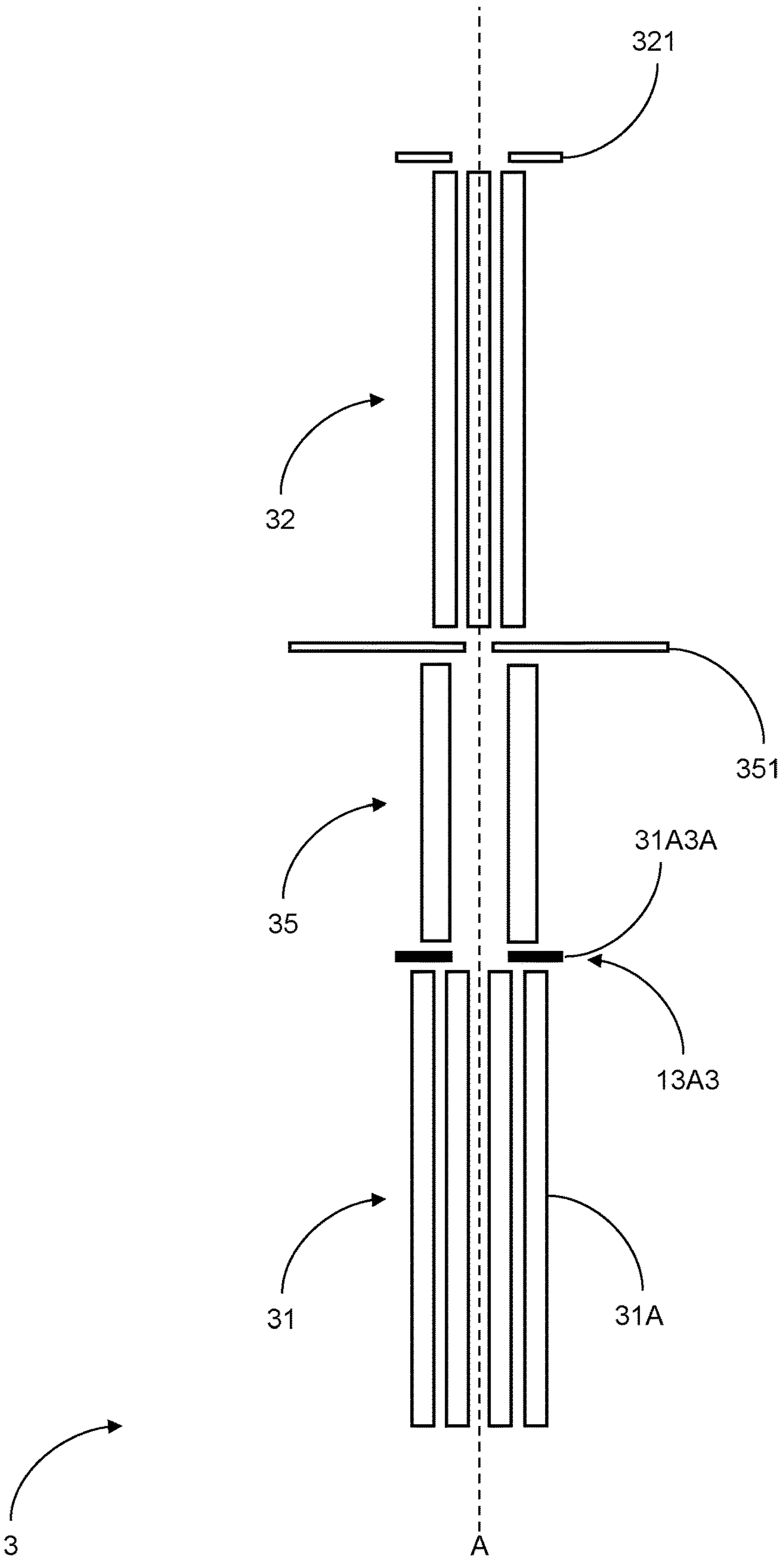
FIG. 3 schematically depicts an apparatus according to an exemplary embodiment.

FIG. 3 schematically depicts an apparatus 3 according to an exemplary embodiment, in more detail. The apparatus 3 is generally as described with respect to the apparatus 1 mutatis mutandis.

In this example, the apparatus 3 comprises a quadrupole mass filter 35, disposed between the array of RF ion accumulation devices 31 and the fragmentation device 32, configured to filter at least a fraction of the ions exiting the array of RF ion accumulation devices 31 and entering the fragmentation device 32, for example wherein an isolation window of the quadrupole mass filter 35 corresponds with the selected mass to charge ratios m/z of the ions exiting the array of RF ion accumulation devices 31.

In more detail, in this example, the ion volume is defined by a set of eight rods equally spaced about a central axis (i.e. an octapole). A pair of antiphase RF potentials is distributed to the octupole rods 31A to generate a pseudo-potential which confines ions radially along the axis. Ions enter and exit along the axis (A) by controlling an axial DC field component, either by segmenting the octupole 31 along the axis to create a step-wise axial DC field along the ion path or by providing a set of auxiliary electrodes disposed in-between the rods and running along the length of the octupole device receiving a separate DC signal. The octupole 31 has larger effective inner diameter (or phase space acceptance) than a quadrupole of similar inscribed radius and therefore a larger effective inner volume for accumulating, storing and processing ions. As a result, more ions can be accumulated in the octupole than a quadrupole of otherwise similar dimensions. However, the octupole doesn't focus ions to the axis as well as a quadrupole. This may lead to an AC lens 31A3A configured with a larger diameter than used with a quadrupole. In this example, an optional entrance optic may be a simple lens (an apertured, conducting plate) which also acts as a pumping restriction.

In one example, the AC lens 13A3 is releasing accumulated ions in order from higher m/z to lower m/z by ramping down the amplitude of the AC signal. Typically, the AC amplitude will be ramped down within a period of several and/or tens of ms, starting from the highest AC amplitude of approximately 800 Vpp down to <50 Vpp where no ions can be prevented from exiting the accumulation device 31. Preferably, the quadrupole mass filter 35 is scanned in parallel, with the isolation window selecting at least a sub-m/z range of the ions eluting from the accumulation device at any given point in time. The scanning period of the quadrupole mass filter is similar to the ramping period of the AC signal and covers the m/z range of interest, for example, the bottom-up proteomics mass range which may extend from 300 m/z to 1000 m/z. Similarly to the AC ejection process releasing ions from higher m/z to lower m/z sequentially, the isolation of the quadrupole mass filter is scanned from higher m/z values to lower m/z values, matching the m/z range exiting the accumulation device 31. In one mode of operation, the width of the isolation window is relatively narrow to select a single or only a few precursors having similar m/z values (<2 Th). In an alternative mode of operation, the isolation window is wider to select multiple precursors. Such examples of defining the width of the quadrupole isolation window can be used in data independent acquisition experiments and are further tailored to the ramping speed of the AC signal applied to AC lens electrode 13A3. Most preferably, the synchronization of the quadrupole mass filter with the AC ramp involves monitoring the number of charges accumulated in the accumulation device 31, as this may cause changes to the elution voltage of the ions exiting through the AC lens 13A3. Ions selected using the quadrupole mass filter are optionally accelerated through the differential aperture 351 into the downstream fragmentation device 32 to kinetic energies above 10 eV to produce fragments. Fragments can be pushed toward the exit of the fragmentation device 32 and mass selectively ejected toward a time-of-flight mass analyzer using a second AC signal applied to electrode 321 and ramped considerably faster, for example in the low micro-second time scale, compared to the first signal applied to the exit lens of the accumulation device 13A3, which is ramped in the milli-second time scale. Multiple AC ramps applied to the second AC lens 321 can be applied during the ramp period of the first AC signal applied to the first AC lens 13A3.

The exit optic is comprised of two lenses and an RF quadrupole. The right-most lens, acting also as a pumping restriction, has a smaller aperture than the AC lens. Thus, the ion volume and exit optic occupy the same pumping region and are operated at substantially the same pressure, this pressure being high enough to induce collisional cooling (e.g. >/=1E-3 mbar). The particular advantage of the RF quadrupole in the exit optic is that the ions can be more strongly focused to the axis and cooled in preparation for injection into downstream optics—for example, an analytical quadrupole.

Figure 4:
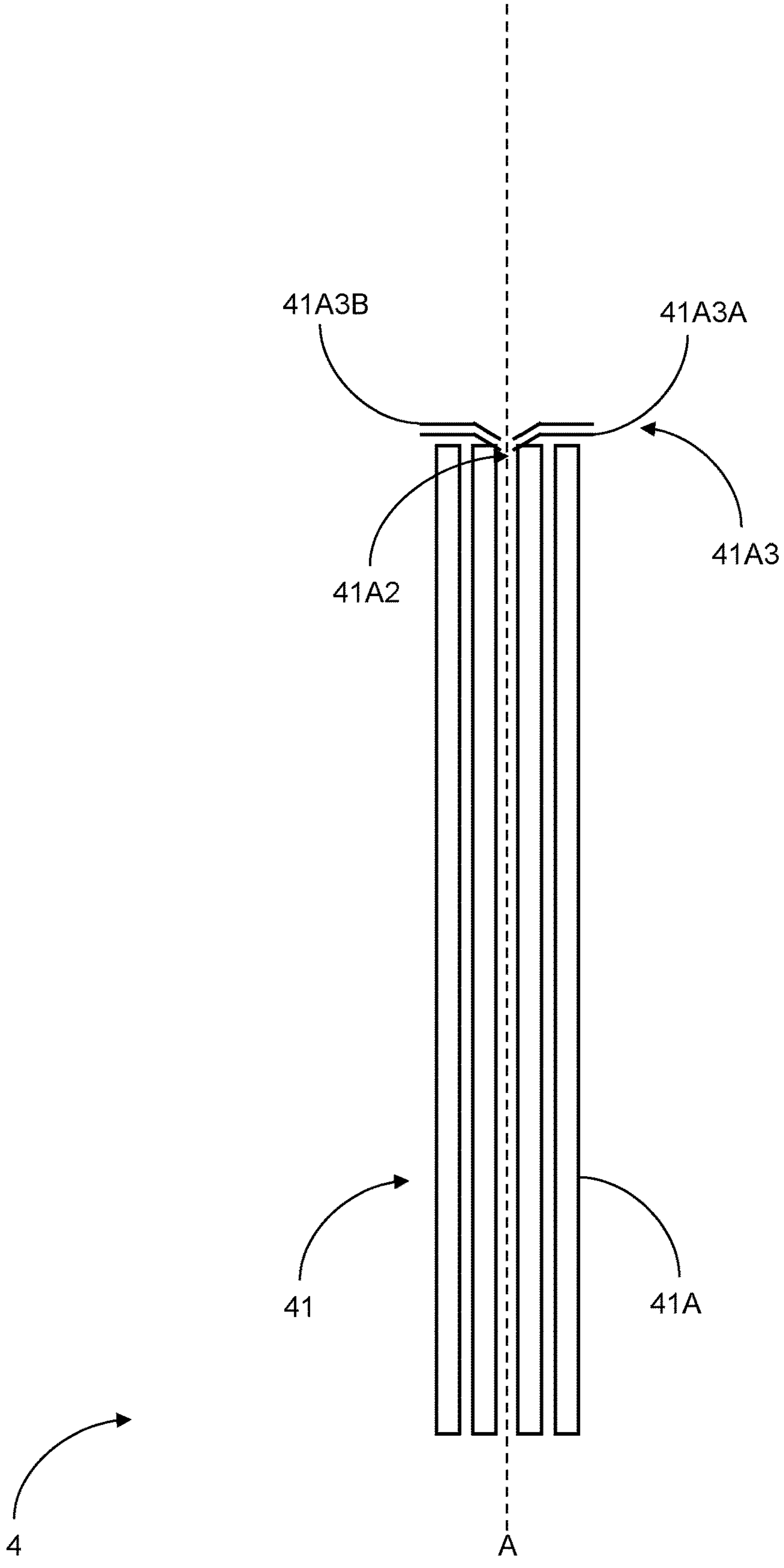
FIG. 4 schematically depicts an apparatus according to an exemplary embodiment.

FIG. 4 schematically depicts an apparatus 4 according to an exemplary embodiment, in more detail. The apparatus 4 is generally as described with respect to the apparatus 1 mutatis mutandis.

In this example, the first electrode 41A3A is a skimmer-shaped electrode having an aperture therethrough, wherein an apex thereof is oriented towards the first end 41A2.

In this example, the first set of electrodes 41A3 includes a second electrode 41A3B, configured to attenuate penetration of the first axial potential barrier downstream thereof. In this example, the second electrode 41A3B is disposed downstream of the first electrode 41A3A and the first end 41A2. In this example, the second electrode 41A3B is a skimmer-shaped electrode having an aperture therethrough, preferably a skimmer-shaped electrode having an aperture therethrough, wherein an apex thereof is oriented towards the first electrode 41A3A. In this example, the first electrode 41A3A is a skimmer-shaped electrode having an aperture therethrough and the second electrode 41A3B is a skimmer-shaped electrode having an aperture therethrough, wherein respective apexes of the first electrode 41A3A and the second electrode 41A3B are oriented towards the first end 41A2 (i.e. mutually nested). In this example, an axial gap between the first electrode 41A3A and the second electrode 41A3B is in a range from 0.5 mm to 3 mm, preferably in a range from 1 mm to 2 mm. In this example, the apex of the first electrode 41A3A protrudes into the first RF ion accumulation device 41A via the first end 41A2 thereof by a distance in a range from 0.5 mm to 3 mm, preferably in a range from 1 mm to 2 mm.

Figure 5:
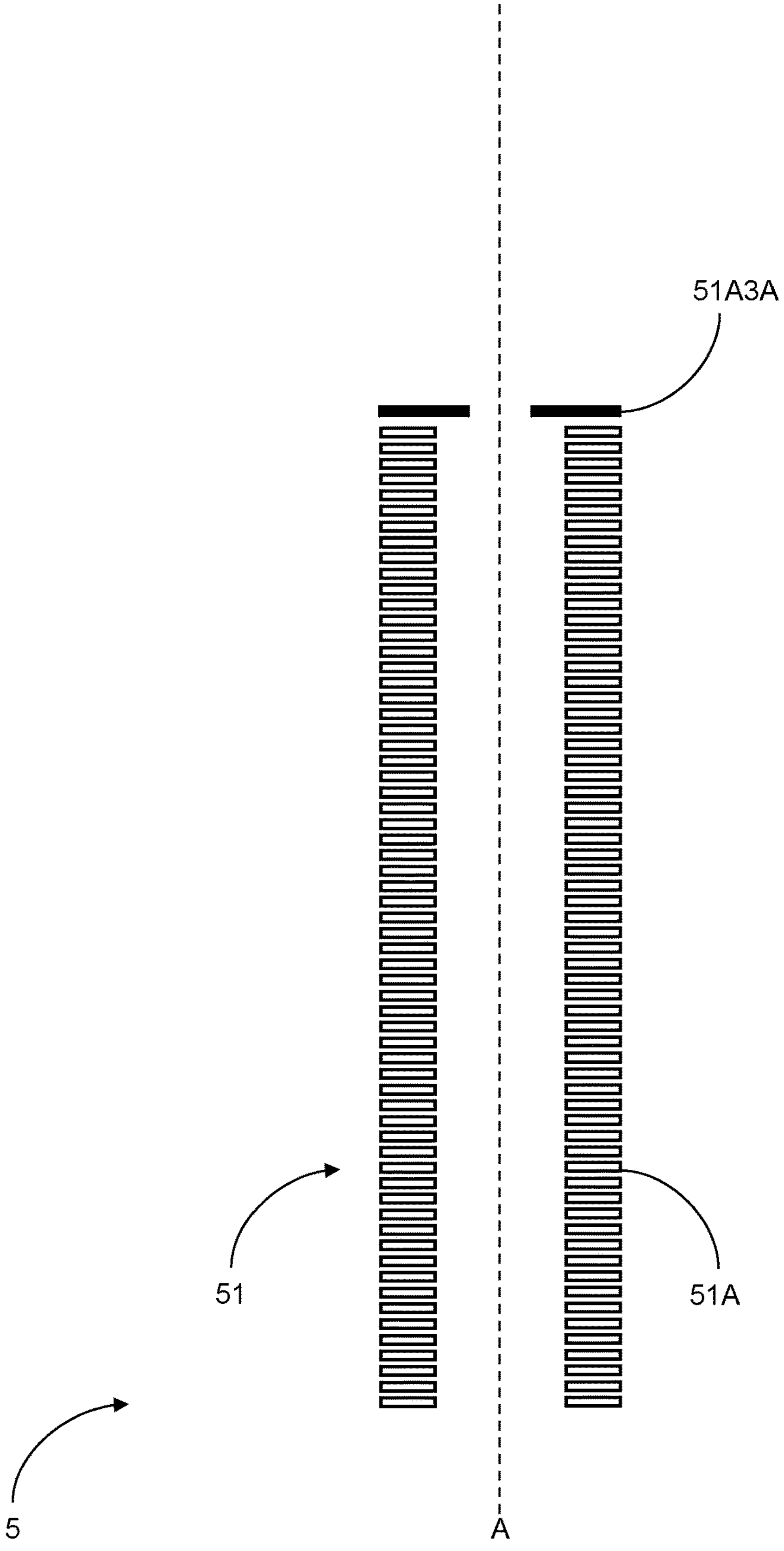
FIG. 5 schematically depicts an apparatus according to an exemplary embodiment.

FIG. 5 schematically depicts an apparatus 5 according to an exemplary embodiment, in more detail. The apparatus 5 is generally as described with respect to the apparatus 1 mutatis mutandis.

In this example, the first RF ion accumulation device 51A comprises a stacked ring ion guide.

In more detail, in this example, the ion volume is defined by a set of circularly apertured electrodes spaced regularly along the axis (Stacked Ring Ion Guide, aka SRIG). RF is applied to the SRIG electrodes to confine the ions to the volume. The phase of RF preferably alternates by 180° from one SRIG electrode to the next along the axis. A DC electric field may be produced along the axis by applying DC potentials to the SRIG electrodes as a function of their axial position. The AC potential or some fraction of the AC potential may be applied to some or all of the SRIG electrodes such that the AC field projects further into the volume than would be possible with the single AC lens. A DC electric field directed toward the exit would produce a force on the ions which depends only on the respective ion's charge, whereas an AC potential applied to the "AC electrode" and optionally some of the SRIG electrodes would produce a force which depends on both ion mass and charge. The net result would be ions eluting according to m/z as the AC potential is reduced or the DC field is increased. Here, the entrance optic is a simple lens (an apertured, conducting plate) which also acts as a pumping restriction. Optionally, an exit optics comprises two lenses and an RF quadrupole. A lens may also provide a pumping restriction. Thus, the ion volume and exit optic occupy the same pumping region and are operated at substantially the same pressure, this pressure being preferably high enough to induce collisional cooling (e.g. >/=1E-3 mbar). The particular advantage of the RF quadrupole in the exit optic is that the ions can be more strongly focused to the axis and cooled in preparation for injection into downstream optics—for example, an analytical quadrupole.

Figure 6:
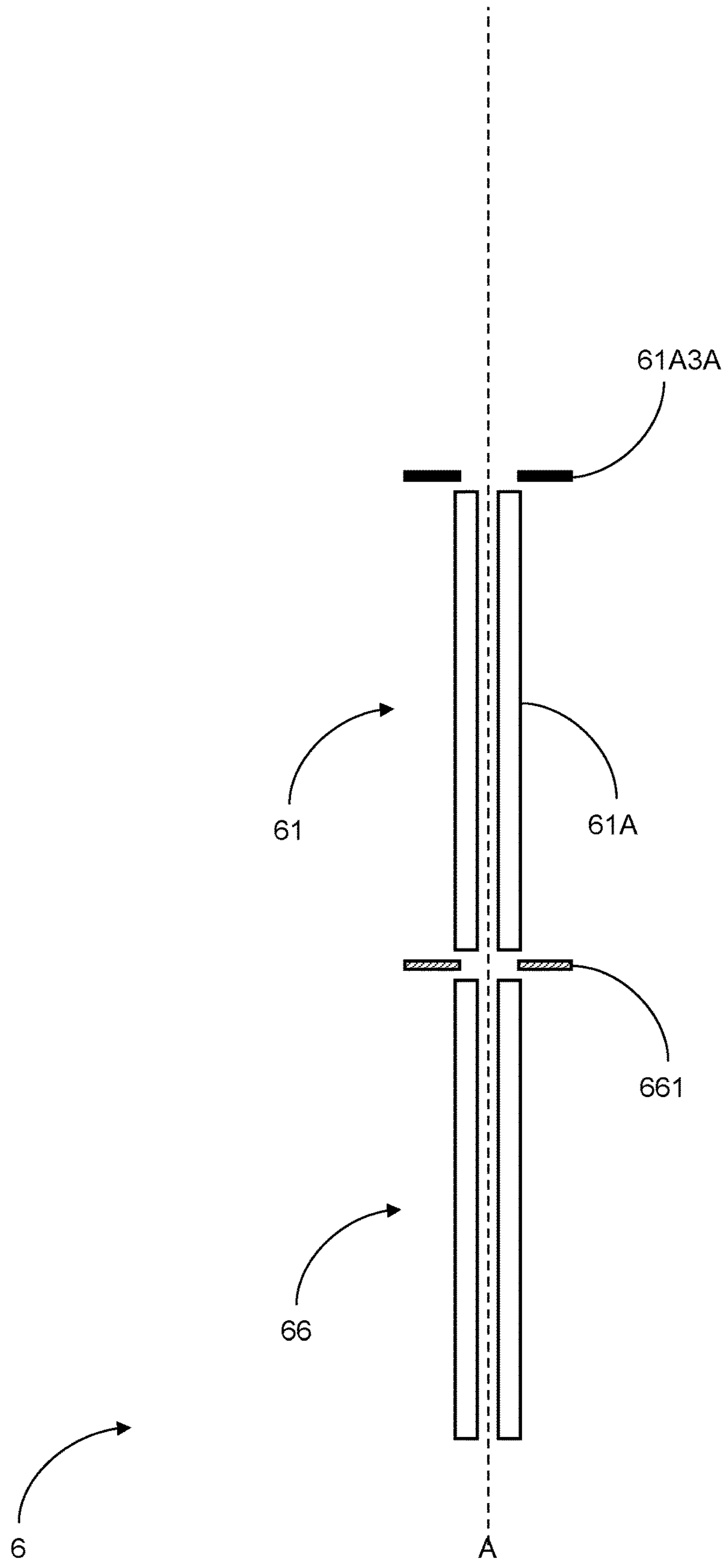
FIG. 6 schematically depicts an apparatus according to an exemplary embodiment.

FIG. 6 schematically depicts an apparatus 6 according to an exemplary embodiment, in more detail. The apparatus 6 is generally as described with respect to the apparatus 1 mutatis mutandis.

In this example, the apparatus 6 comprises an ion storage device 66, disposed upstream of the array of RF ion accumulation devices 61, configured to store ions, for example from the continuous ion flux from the ion source, when the array of RF ion accumulation devices is configured in the respective first configurations. In this example, the ion storage device comprises a first electrode 661, configured to provide an axial potential barrier at, proximal and/or adjacent to the ion exit thereof, to control storage of ions therein and release of stored ions therefrom, to the array of RF ion accumulation devices 61.

In more detail, in this example, the first RF ion accumulation device comprises a quadrupole rod set, an entrance lens (apertured electrically conducting plate) and the first electrode is provided by an exit lens (apertured electrically conducting plate). The quadrupole includes four conducting rods spaced equally about an axis. In operation, an RF potential is applied between these rods to generate a pseudo-potential field which focuses ions towards the axis. Four additional so-called LINAC (linear accelerator) electrodes assembled about the axis interstitial to the RF quadrupole rods. These linac electrodes can optionally be used to produce a DC electric field—i.e. a first force—which can push ions toward the quadrupole exit. The quadrupole RF rods define a volume centered on the axis which is the ion volume.

In operation, the entrance lens is held at a repulsive potential relative to the bias of the quadrupole such that ions are pushed into, and prevented from escaping, the ion volume, in the first configuration. In operation, the exit lens has an applied AC and DC potential which are set as described according to the first aspect. In this example, the first RF ion accumulation device is operated at about 1E-3 mbar pressure of nitrogen.

As an example, electrical potentials applied during the analysis of a myoglobin digest are:

- Multipole RF (the RF potential applied to the RF rods) =400 Vpp @ 1.7 MHz
- Multipole Bias (the DC potential applied to the RF rods)=25.5 V
- LINAC (the DC potential applied to the DC rods)=26 V
- Exit Lens DC potential=25.0 V
- Exit Lens AC Frequency=1.12 MHz
- Exit AC Amplitude was initially set to 475 Vpp for ion accumulation Ions were allowed to accumulate for 50 ms (i.e. duration of first configuration). To elute ions from the volume, the exit AC was scanned down from 475 to 0 V, linearly over 990 ms (i.e. duration of second configuration).

In this, the apparatus comprises an ion storage device. The ion storage device is typically held at a pressure of 2.6 mbar at its entrance end and 0.8 mbar at its exit.

In this example, ions from the upstream continuous ion source are stored and released from the ion storage device into the first RF ion accumulation device. This store and release is performed in synchronization—in parallel—to the analysis of ions in the first RF ion accumulation device. In this example, a group of ions is stored in the ion storage device while simultaneously, an earlier accumulated group of ions is analyzed in the first RF ion accumulation device. Once the group of ions in the first RF ion accumulation device has been analyzed by, for example, scanning down the exit AC potential, the first RF ion accumulation device potentials are returned to accumulating potentials and the newly stored group of ions in the ion storage device is released into the first RF ion accumulation device. By this approach, it is possible to achieve 100%, or near 100% duty cycle. Thus, according to this method:

(a) the first RF ion accumulation device electrode potentials are set such that ions of an m/z range of interest can be trapped in the ion volume of the array of RF ion accumulation devices;

(b) a first group of ions is transferred into the first RF ion accumulation device from the ion storage device wherein these ions have been stored from a source of ions;

(c) the upstream ion storage device is returned to a set of potentials such that a second group of ions from the source can be stored;

(d) while the second group of ions is being stored in the upstream ion storage device, the first group of ions is processed in the first RF ion accumulation device by scanning one of the forces in the first RF ion accumulation device;

(e) the first RF ion accumulation device electrode potentials are set such that ions of an m/z range of interest can be accumulated in the first RF ion accumulation device;

(f) the second group of ions is transferred into the first RF ion accumulation device from the upstream ion storage device; and (g) so forth-repeating steps (a)-(d) for any number of ion groups.

Figure 7:
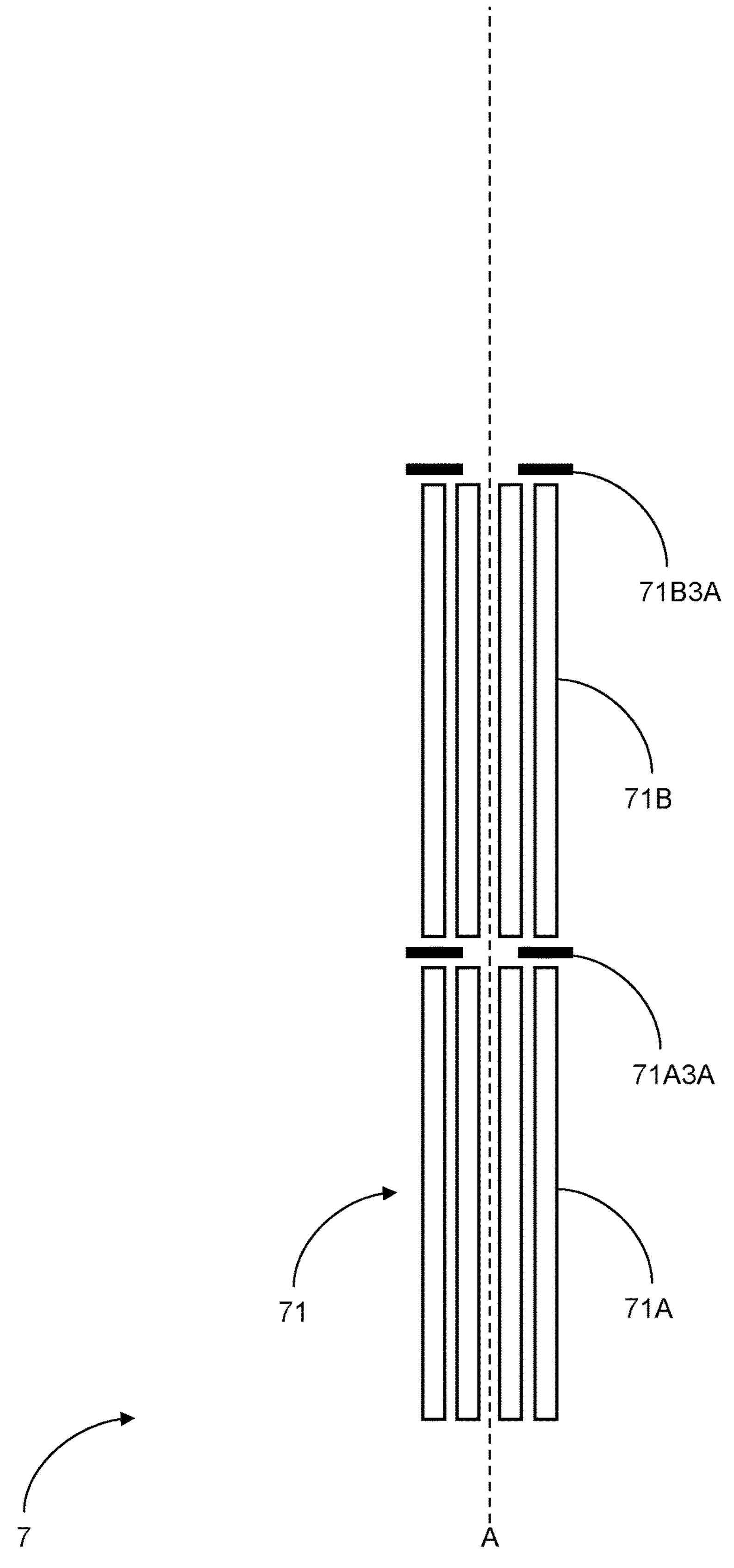
FIG. 7 schematically depicts an apparatus according to an exemplary embodiment.

FIG. 7 schematically depicts an apparatus 7 according to an exemplary embodiment, in more detail. The apparatus 7 is generally as described with respect to the apparatus 1 mutatis mutandis.

In this example, the array of RF ion accumulation devices 71 includes two RF ion accumulation devices 71A, 71B, including the first RF ion accumulation device 71A, disposed mutually in series.

Figure 8:
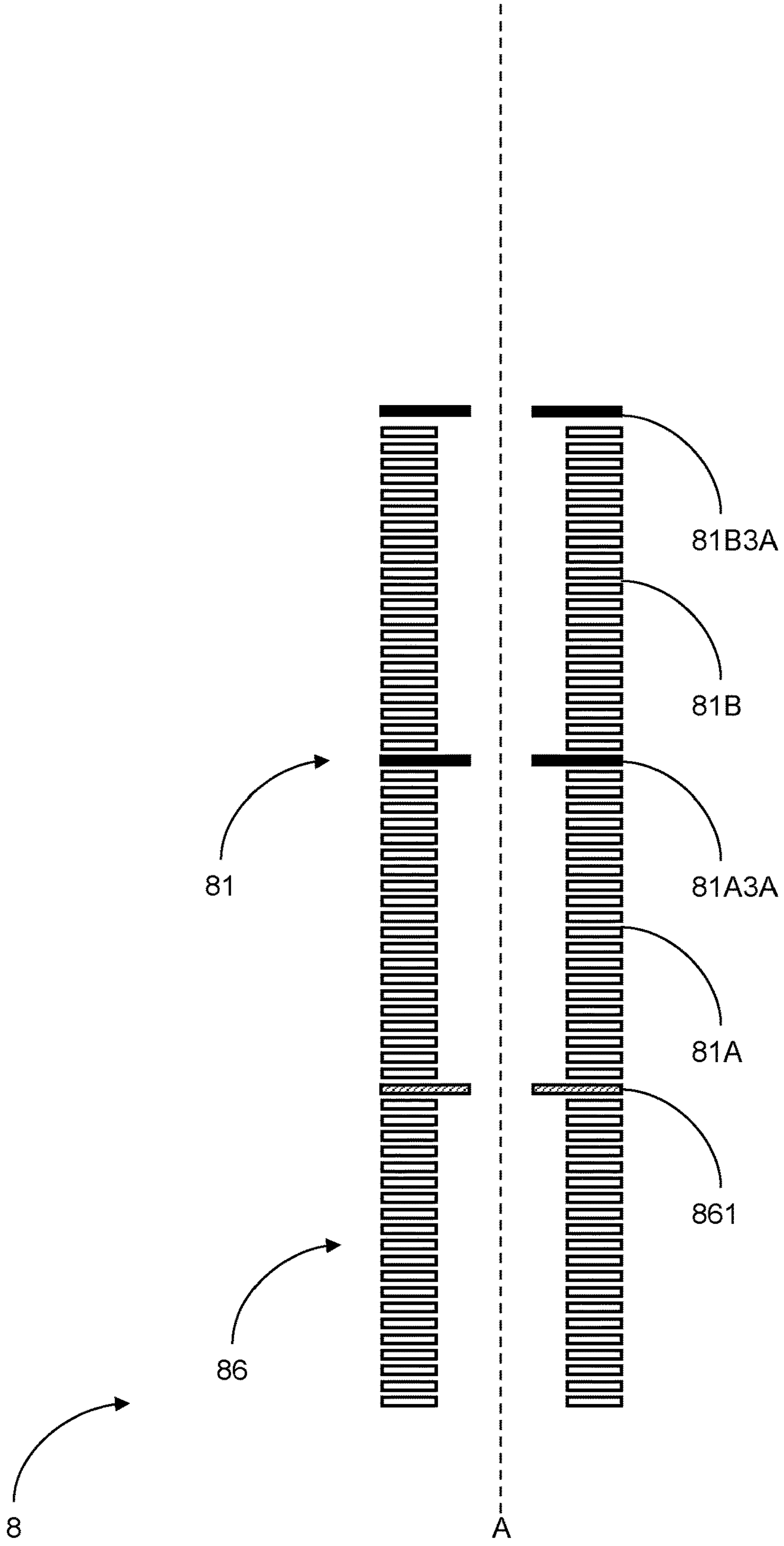
FIG. 8 schematically depicts an apparatus according to an exemplary embodiment.

FIG. 8 schematically depicts an apparatus 8 according to an exemplary embodiment, in more detail. The apparatus 8 is generally as described with respect to the apparatus 5 mutatis mutandis.

In this example, the array of RF ion accumulation devices 81 includes two RF ion accumulation devices 81A, 81B, including the first RF ion accumulation device 81A, disposed mutually in series. In this example, the two RF ion accumulation devices 81A, 81B are provided by: a single or monolithic RF ion accumulation device, for example as two ion accumulation regions therein.

In this example, the apparatus 8 comprises an ion storage device 86, disposed upstream of the array of RF ion accumulation devices 81, configured to store ions, for example from the continuous ion flux from the ion source, when the array of RF ion accumulation devices is configured in the respective first configurations. In this example, the ion storage device comprises a first electrode 861, configured to provide an axial potential barrier at, proximal and/or adjacent to the ion exit thereof, to control storage of ions therein and release of stored ions therefrom, to the array of RF ion accumulation devices 81.

In this example, the first RF ion accumulation device 81A and the second RF ion accumulation device 81B comprise stacked ring ion guides. In this example, the ion storage device 86 comprises a stacked ring ion guide. In this example, the two RF ion accumulation devices 81A, 81B and the ion storage device 86 are provided by: a single or monolithic device, for example as regions therein.

Figure 9:
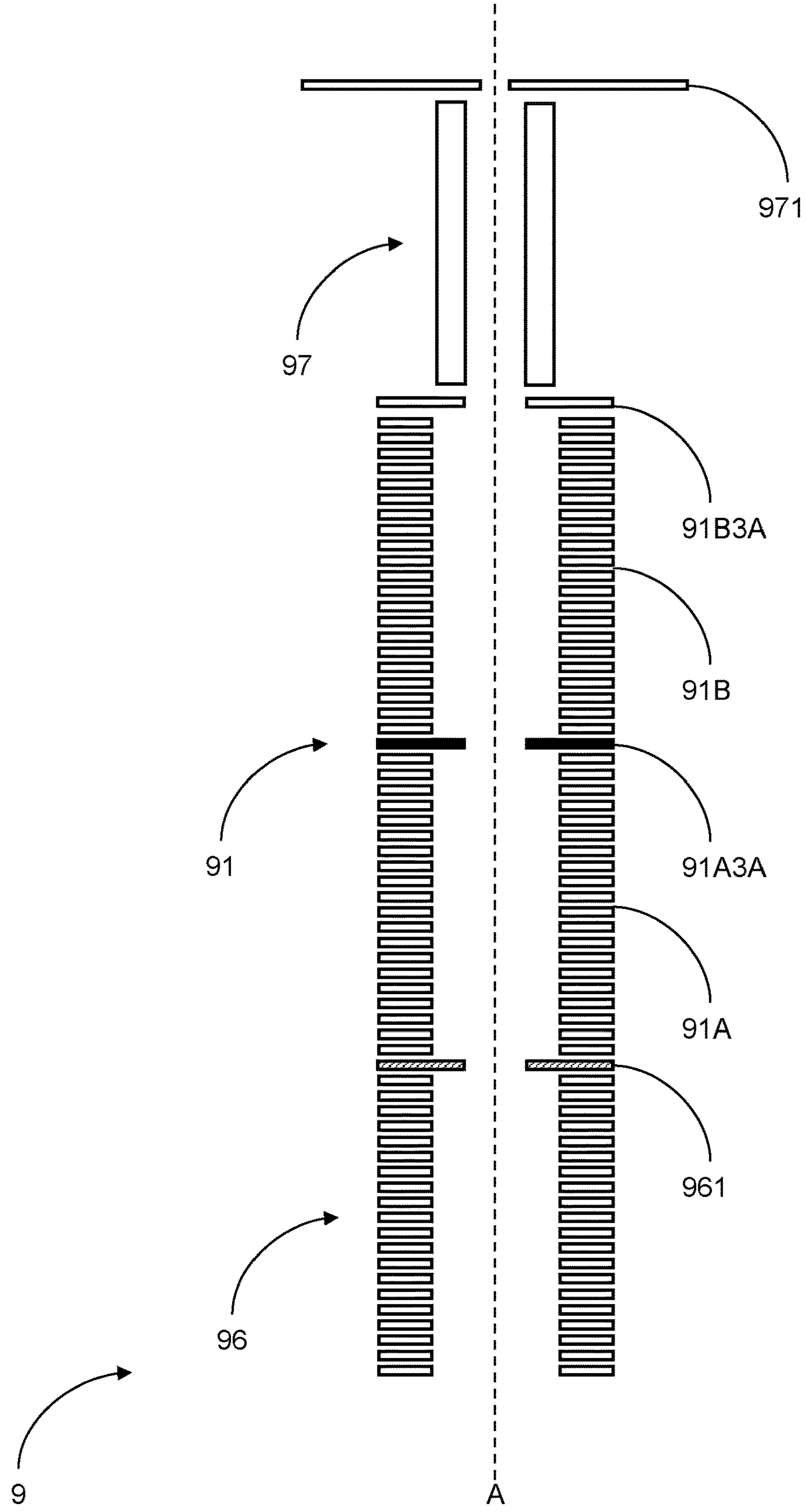
FIG. 9 schematically depicts an apparatus according to an exemplary embodiment.

FIG. 9 schematically depicts an apparatus 9 according to an exemplary embodiment, in more detail. The apparatus 9 is generally as described with respect to the apparatus 8 mutatis mutandis.

In this example, the apparatus 9 comprises an ion guide 97, having an ion entrance and an ion exit, disposed mutually in series with the array of RF ion accumulation devices 91 and wherein the ion guide 97 is disposed downstream of the array of RF ion accumulation devices 91; wherein the ion guide 97 is configured to radially focus ions ejected from the array of RF ion accumulation devices 91. In this example, the ion guide 97 is a quadrupole ion guide, for example wherein a Q value of the quadrupole ion guide is configured to match a Q value of a downstream quadrupole mass filter.

Figure 10:
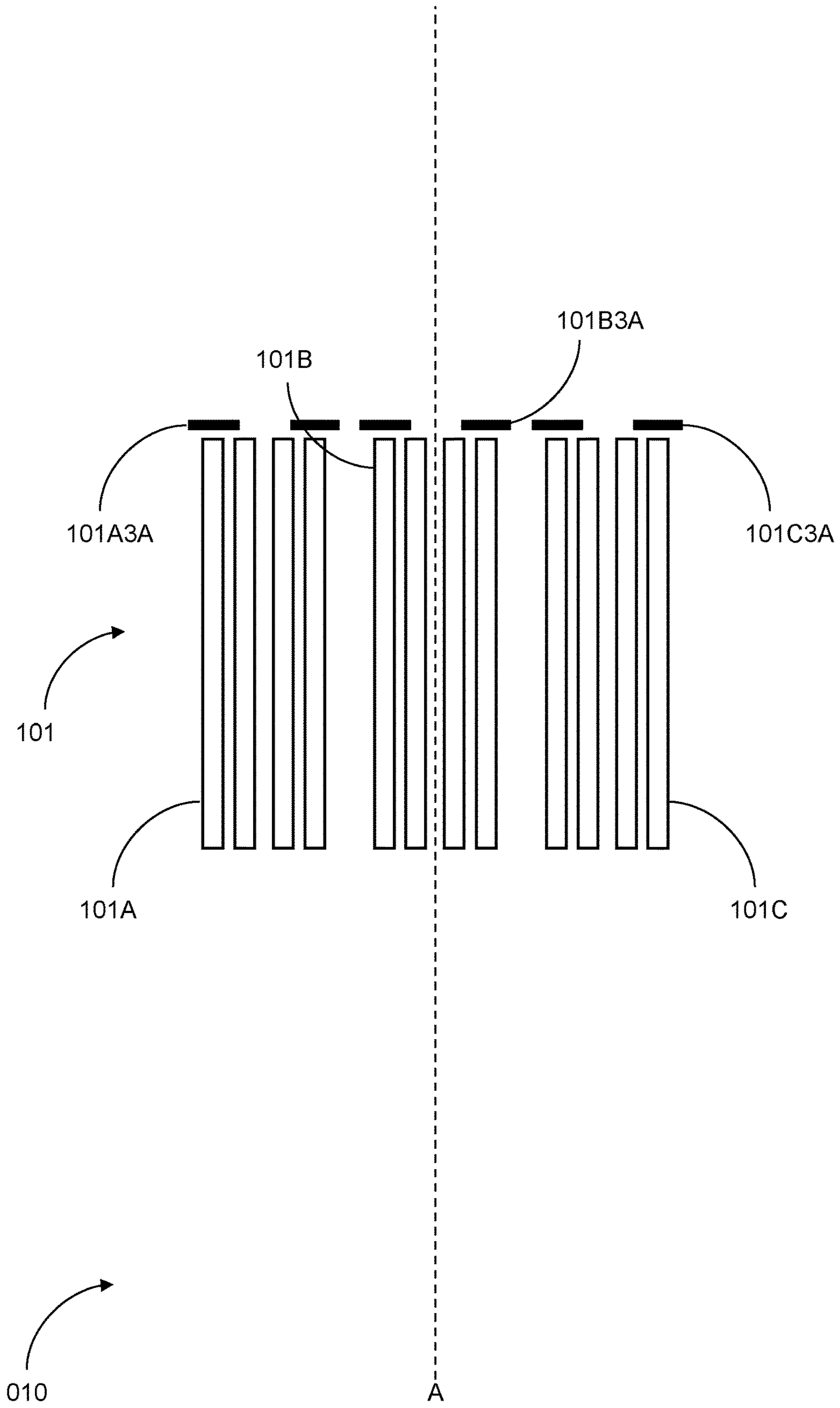
FIG. 10 schematically depicts an apparatus according to an exemplary embodiment.

FIG. 10 schematically depicts an apparatus 010 according to an exemplary embodiment, in more detail. The apparatus 010 is generally as described with respect to the apparatus 1 mutatis mutandis.

In this example, the array of RF ion accumulation devices 101 includes three RF ion accumulation devices 101A, 01B, 101C, including the first RF ion accumulation device 101A, disposed mutually in parallel. In this example, the three RF ion accumulation devices 101A, 101B, 101C, disposed mutually in parallel, are disposed planarly (i.e. a 2D arrangement wherein an RF ion accumulation device has one or at most two mutually adjacent neighbours, for example for filling transversely).

Figure 11:
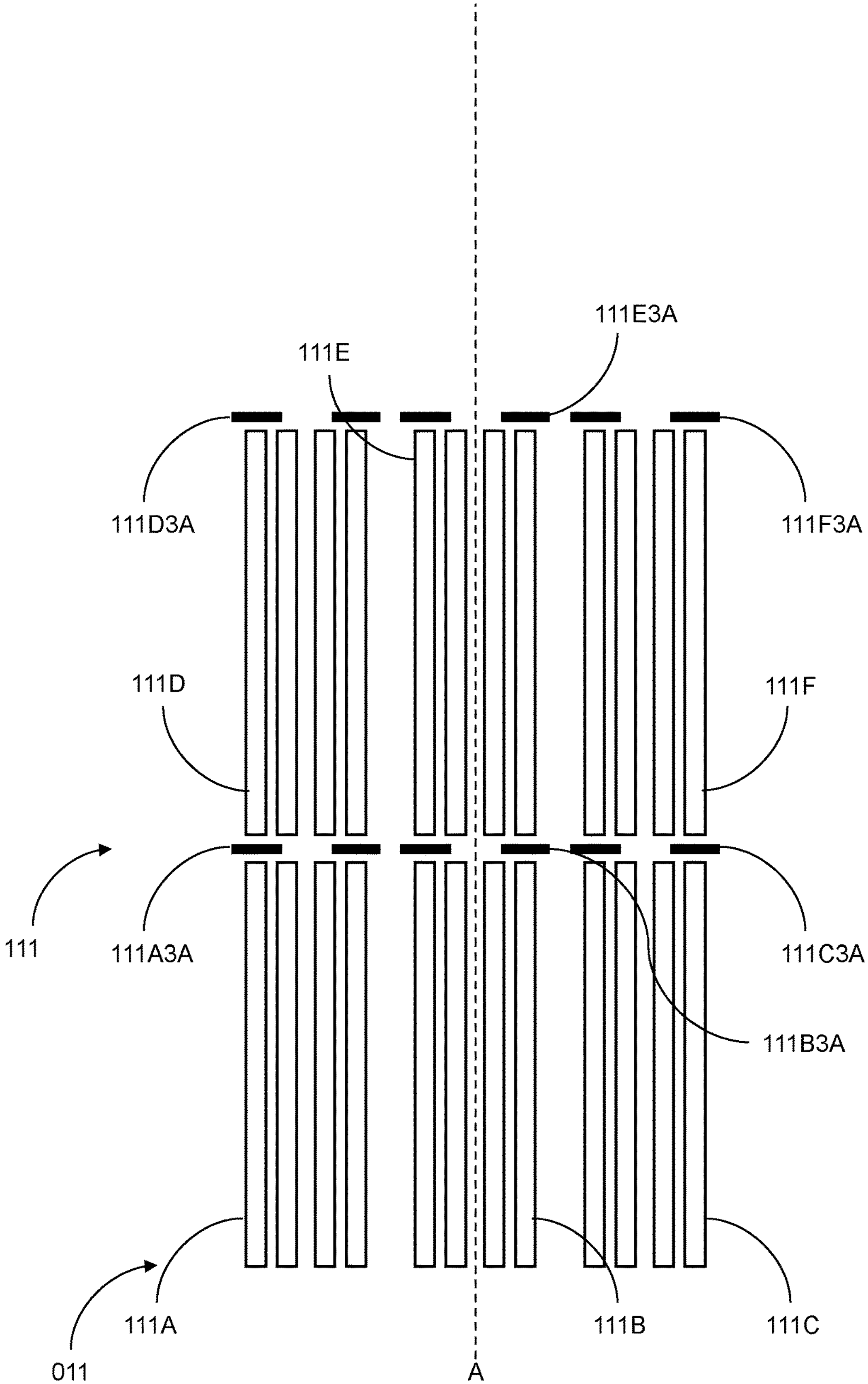
FIG. 11 schematically depicts an apparatus according to an exemplary embodiment.

FIG. 11 schematically depicts an apparatus 011 according to an exemplary embodiment, in more detail. The apparatus 011 is generally as described with respect to the apparatus 010 mutatis mutandis.

In this example, the array of RF ion accumulation devices 111 includes six RF ion accumulation devices 111A, 111B, 111C, 111D, 111E, 111F:

two RF ion accumulation devices, including the first RF ion accumulation device 111A, disposed mutually in series; and three RF ion accumulation devices, including the first RF ion accumulation device 111A, disposed mutually in parallel, wherein n is a natural number less than N.

That is, RF ion accumulation devices: 111A, 111B, 111C; and 111D, 111E, 111F are respectively mutually in parallel and RF ion accumulation devices: 111A, 111D; 111B, 111E; and 111C, 111F are respectively mutually in series.

Figure 12:
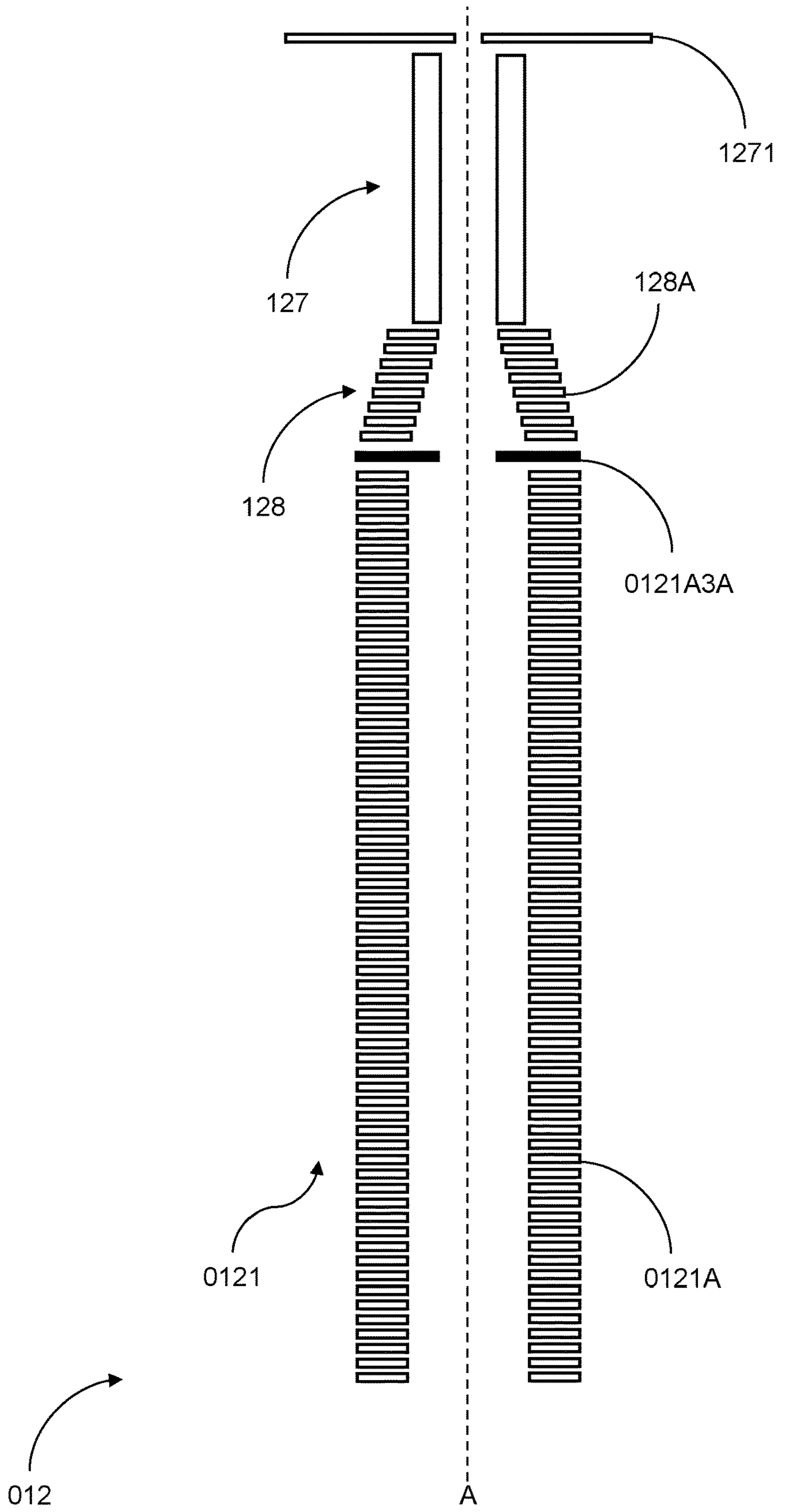
FIG. 12 schematically depicts an apparatus according to an exemplary embodiment.

FIG. 12 schematically depicts an apparatus 012 according to an exemplary embodiment, in more detail. The apparatus 012 is generally as described with respect to the apparatus 5 mutatis mutandis.

In this example, the apparatus 012 comprises an ion guide 127, having an ion entrance and an ion exit, disposed mutually in series with the array of RF ion accumulation devices 0121 and wherein the ion guide 127 is disposed downstream of the array of RF ion accumulation devices 121; wherein the ion guide 127 is configured to radially focus ions ejected from the array of RF ion accumulation devices 0121. In this example, the ion guide 127 is a quadrupole ion guide, for example wherein a Q value of the quadrupole ion guide is configured to match a Q value of a downstream quadrupole mass filter.

In this example, the apparatus 012 comprises a set of ion manifold devices 128, including a first ion manifold device 128A, configured to guide ions out of the respective RF ion accumulation devices of the array 0121 thereof; wherein the first ion manifold device 128A comprises an ion funnel. In this example, the ion funnel is a stacked ring ion guide comprising rings of decreasing aperture diameter.

In this example, the ion volume is defined by a set of circularly apertured SRIG electrodes spaced regularly along the axis. RF is applied to the SRIG electrodes to confine the ions to the volume. The phase of RF preferably alternates by 180° from one SRIG electrode to the next along the axis. A DC electric field may be produced along the axis by applying DC potentials to the SRIG electrodes as a function of their axial position. The AC potential or some fraction of the AC potential may be applied to some or all of the SRIG electrodes so the AC field projects further into the volume than would be possible with the single AC lens. The relatively large apertures in the SRIG electrodes provide relatively more volume for ion accumulation. The apertures in the SRIG electrodes are larger than the inscribed diameter of the quadrupole in the exit optic. To deal with the mismatch in SRIG vs quadrupole diameters, an ion funnel is incorporated in the exit optics. The ion funnel focuses ions from the larger diameter SRIG into the quadrupole. The ion funnel is a set of RF lenses of decreasing aperture diameter spaced evenly along the axis. Preferably, the lenses are electrically driven from the same RF supply as the SRIG.

Figure 13:
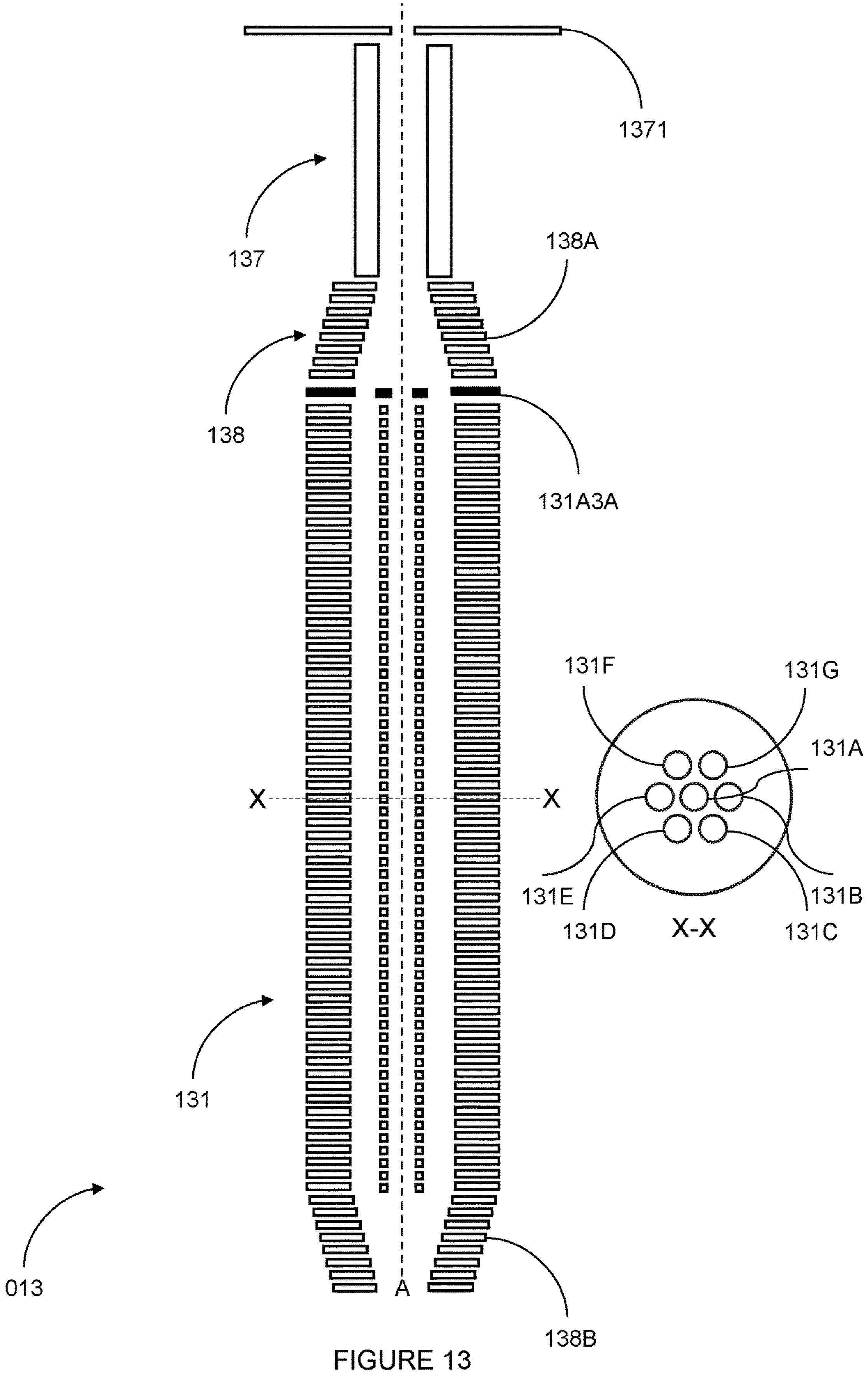
FIG. 13 schematically depicts an apparatus according to an exemplary embodiment.

FIG. 13 schematically depicts an apparatus 013 according to an exemplary embodiment, in more detail. The apparatus 013 is generally as described with respect to the apparatus 12 mutatis mutandis.

In this example, the array of RF ion accumulation devices 131 includes seven RF ion accumulation devices 131A to 131G, including the first RF ion accumulation device 131A, mutually in parallel. In this example, the array of RF ion accumulation devices 131 comprises a stacked ring ion guide, wherein respective rings have seven apertures therethrough, thereby providing the seven RF ion accumulation devices 131A to 131G, as schematically depicted in FIG. 13 Section X-X.

In this example, the set of ion manifold devices 138 includes a second ion manifold device 138B, configured to guide ions into the respective RF ion accumulation devices of the array 131 thereof; wherein the first ion manifold device 138B comprises an ion funnel. In this example, the ion funnel is a stacked ring ion guide comprising rings of increasing aperture diameter.

Figure 14:
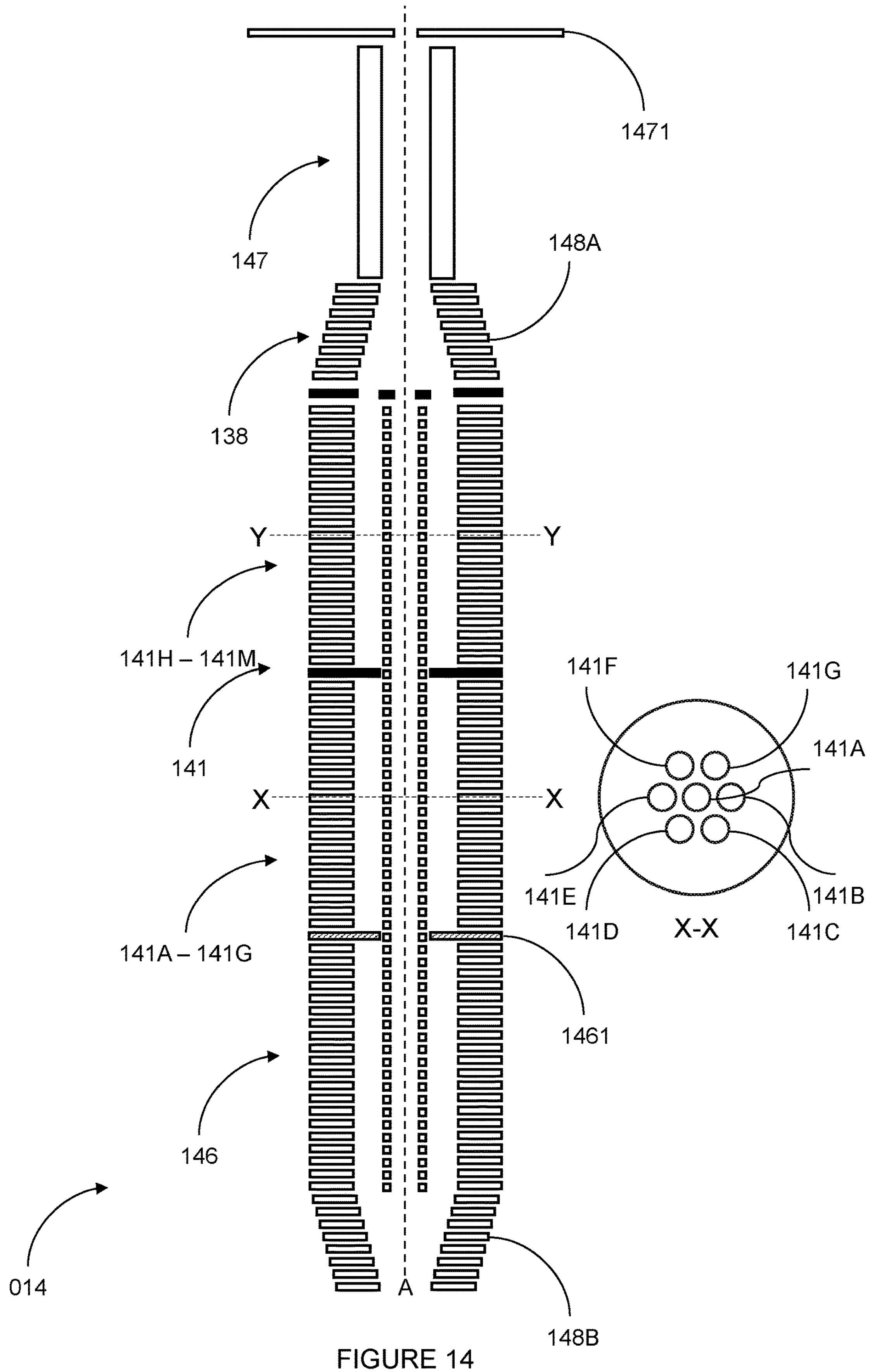
FIG. 14 schematically depicts an apparatus according to an exemplary embodiment.

FIG. 14 schematically depicts an apparatus 014 according to an exemplary embodiment, in more detail. The apparatus 014 is generally as described with respect to the apparatus 13 mutatis mutandis.

In this example, the array of RF ion accumulation devices 141 includes seven RF ion accumulation devices 141H to 141M mutually in parallel. In this example, the seven RF ion accumulation devices 141H to 141M are mutually in series with the seven RF ion accumulation devices 141A to 141G, respectively. FIG. 14 Section Y-Y is similar to FIG. 14 Section X-X, mutatis mutandis.

In this example, the apparatus 014 comprises an array of ion storage devices 146, disposed upstream of the array of RF ion accumulation devices 141, configured to store ions, for example from the continuous ion flux from the ion source, when the array of RF ion accumulation devices 141 is configured in the respective first configurations. In this example, the array of ion storage devices includes seven ion storage devices, mutually in parallel, and mutually in series with the seven RF ion accumulation devices 141H to 141M mutually in series with the seven RF ion accumulation devices 141A to 141G, respectively. The array of ion storage devices comprises a first electrode 861, configured to provide an axial potential barrier at, proximal and/or adjacent to the ion exit thereof, to control storage of ions therein and release of stored ions therefrom, to the array of RF ion accumulation devices 141.

Figure 15:
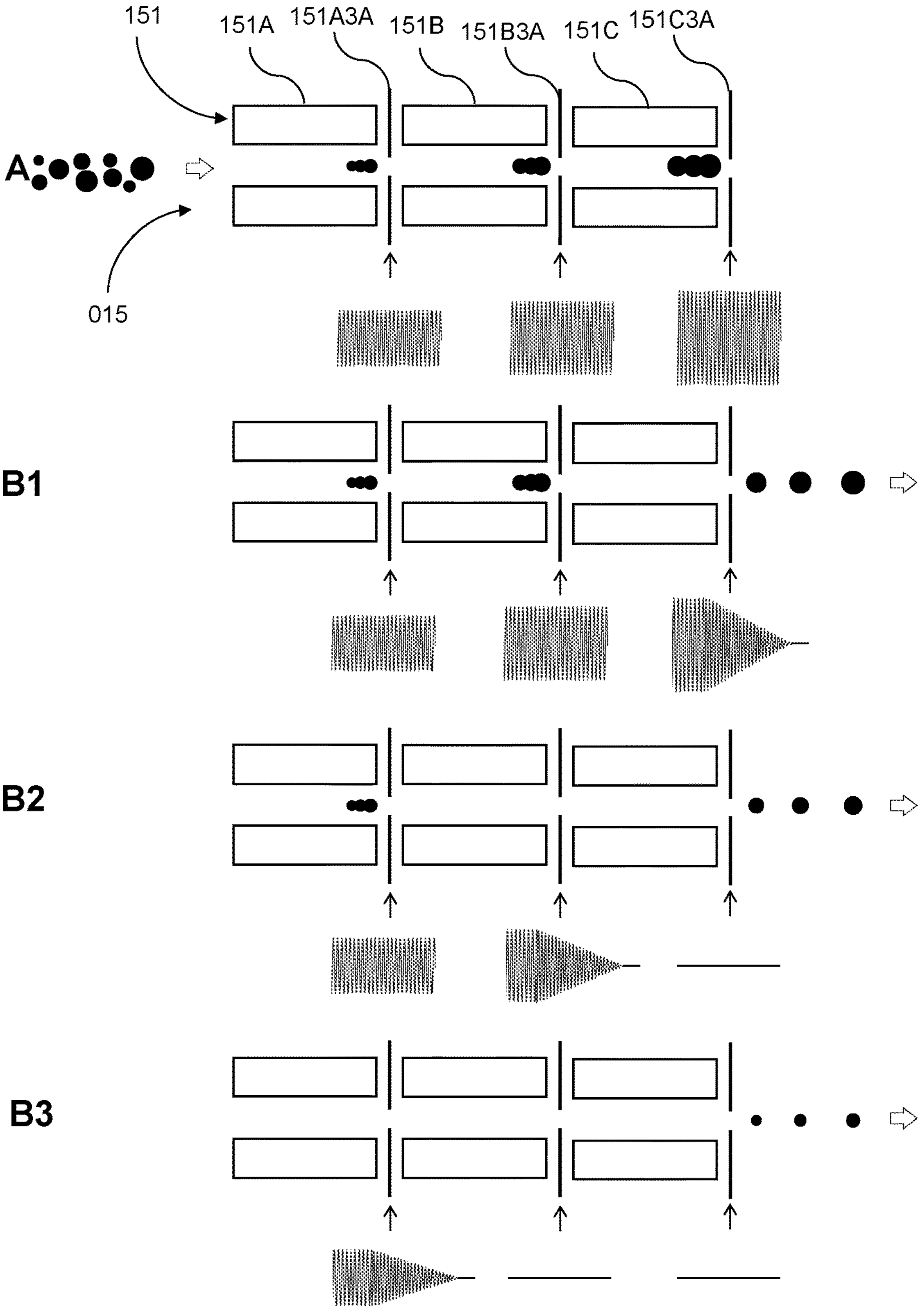
FIG. 15 schematically depicts an apparatus according to an exemplary embodiment.

FIG. 15 schematically depicts an apparatus and a method according to an exemplary embodiment.

The apparatus 015 is generally as described with respect to the apparatus 7 mutatis mutandis. In this example, the array of RF ion accumulation devices 151 includes three RF ion accumulation devices 151A, 151B, 151C, including the first RF ion accumulation device 151A, disposed mutually in series (also known as a coaxial multi-segment RF ion accumulation device). The array of RF ion accumulation devices 151 is configured to increase ion storage capacity, enhance mass selectivity during ejection, and/or enable hierarchical, time-structured ion release across multiple coaxial radio-frequency (RF) ion guide segments. In this example, the array of RF ion accumulation devices comprises at least a first, a second and a third RF ion accumulation device, arranged coaxially and in series along a common longitudinal axis. Each RF ion accumulation device 151A, 151B, 151C is provided with an RF drive for radial ion confinement and a respective first electrode 151A3A, 151B3A, 151C3A disposed at the respective ion exit of each RF ion accumulation device 151A, 151B, 151C. Each of the respective first electrodes 151A3A, 151B3A, 151C3A receives a respective (for example, an individual and/or independently controlled) AC signal which provides an AC potential barrier whose height is set by the AC amplitude during a first phase of operation (i.e. the first configuration)

First Phase of Operation—Mass-Dependent Fractionation and Storage Behind Segment-Specific AC Barriers During the first phase of operation Step A (i.e. the first configuration), incoming ions enter the first RF ion accumulation device 151A while the respective first electrode 151A3A is supplied with an AC signal having a lowest amplitude among respective first electrodes 151A3A, 151B3A, 151C3A of the array of RF ion accumulation devices 151. This lowest amplitude establishes a first AC barrier having a height which confines relatively lighter ions (lower m/z) within this first ion accumulation device 151A, while simultaneously permitting relatively heavier ions (higher m/z) to overcome the first AC barrier and pass into the second RF ion accumulation device 151B and optionally the third RF ion accumulation device 151C.

The respective first electrode 151B3A of the second RF ion accumulation device 151B is driven with an AC signal of relatively higher amplitude, thereby establishing a second AC barrier with relatively greater height. In this manner, ions entering the second RF ion accumulation device 151B experience a relatively stronger axial confinement threshold such that only ions above a correspondingly higher m/z cut-off are able to pass downstream, for example into any downstream RF ion accumulation devices 151C, while ions below this cut-off are confined therein, thereby accumulating and thermalizing in the second RF ion accumulation device 151B, behind the second AC barrier.

In this way, during the first phase of operation, ions progressively partition or self-partition along the various RF ion accumulation devices 151A, 151B, 151C according to their respective m/z as confined by the successive AC potential barriers. After a sufficient accumulation time, the ion flux from the ion source is partitioned into discrete m/z fractions, each accumulated behind a corresponding AC barrier having a height defined by the independently selectable AC amplitude supplied to the respective first electrodes 151A3A, 151B3A, 151C3A.

Second phase of operation-Sequential Release from Downstream to Upstream Segments via Millisecond-Scale AC Ramp During the second phase of operation, mass-selective ejection is initiated beginning with the final RF ion accumulation device 151C (i.e. the RF ion accumulation device nearest the activation/dissociation device or downstream optics) (Step B1). The AC signal applied to the respective first electrode 151CA3 is decreased, for example stepped and/or ramped, from a higher amplitude to a lower amplitude over a millisecond timescale, preferably between 1 and 1000 ms, and most preferably between 5 and 250 ms. As the AC barrier decreases, ions stored behind the barrier are released from higher to lower m/z, resulting in a mass-ordered ion packet directed toward downstream ion optical components.

While the final RF ion accumulation device 151C is releasing its ions, all ions stored in upstream RF ion accumulation devices 151A, 151B remain confined behind their respective AC barriers. Once the ejection from the final RF ion accumulation device 151C is completed, the AC amplitude applied to the preceding upstream first electrode 151B3A is likewise decreased from a higher to a lower amplitude, again over a millisecond timescale, thereby releasing its accumulated ion fraction from high m/z to low m/z (Step B2). This progressive ion-ejection cascade continues downstream-to-upstream (Step B1, Step B2, Step B3) until all ions accumulated in all RF ion accumulation devices 151C, 151B, 151A have been sequentially released, in turn.

The sequential AC-ramping process therefore propagates backwards or upstream along the array of RF ion accumulation devices 151C, 151B, 151A, beginning at the final RF ion accumulation device 151C and advancing toward the first RF ion accumulation device 151A. This establishes a hierarchical mass-selective ejection sequence wherein each RF ion accumulation device releases its accumulated ions only after the downstream RF ion accumulation device has fully released its accumulated ion fraction from high m/z to low m/z. At the conclusion of the first and second phases of operation, ions may be received from the ion source and/or a subsequent packet of ions may be received from an upstream ion storage region, and the operation repeated. In one example, a parallel ion storage device is disposed upstream and configured to receive and store ions throughout the duration of the m/z selective ejection phase described for the array of RF ion accumulation devices 151. The array of RF ion accumulation devices 151 may additionally and/or alternatively be operated in a comparable manner while accepting a continuous ion flux from the ion source. In this mode, the continuous ion flux is preferably modulated using a deflector lens to prevent ion injection into the RF ion accumulation device during the second phase.

Dividing into multiple RF ion accumulation devices substantially increases ion handling capacity, enabling accumulation and mass-selective ejection of a larger number of ions and/or having a greater charge per unit time. As a result, cycle-to-cycle variations in AC ejection amplitude caused by fluctuating charge loads are reduced, allowing quadrupole isolation windows to be more precisely synchronized with the m/z selective ejection process.

Figure 16:
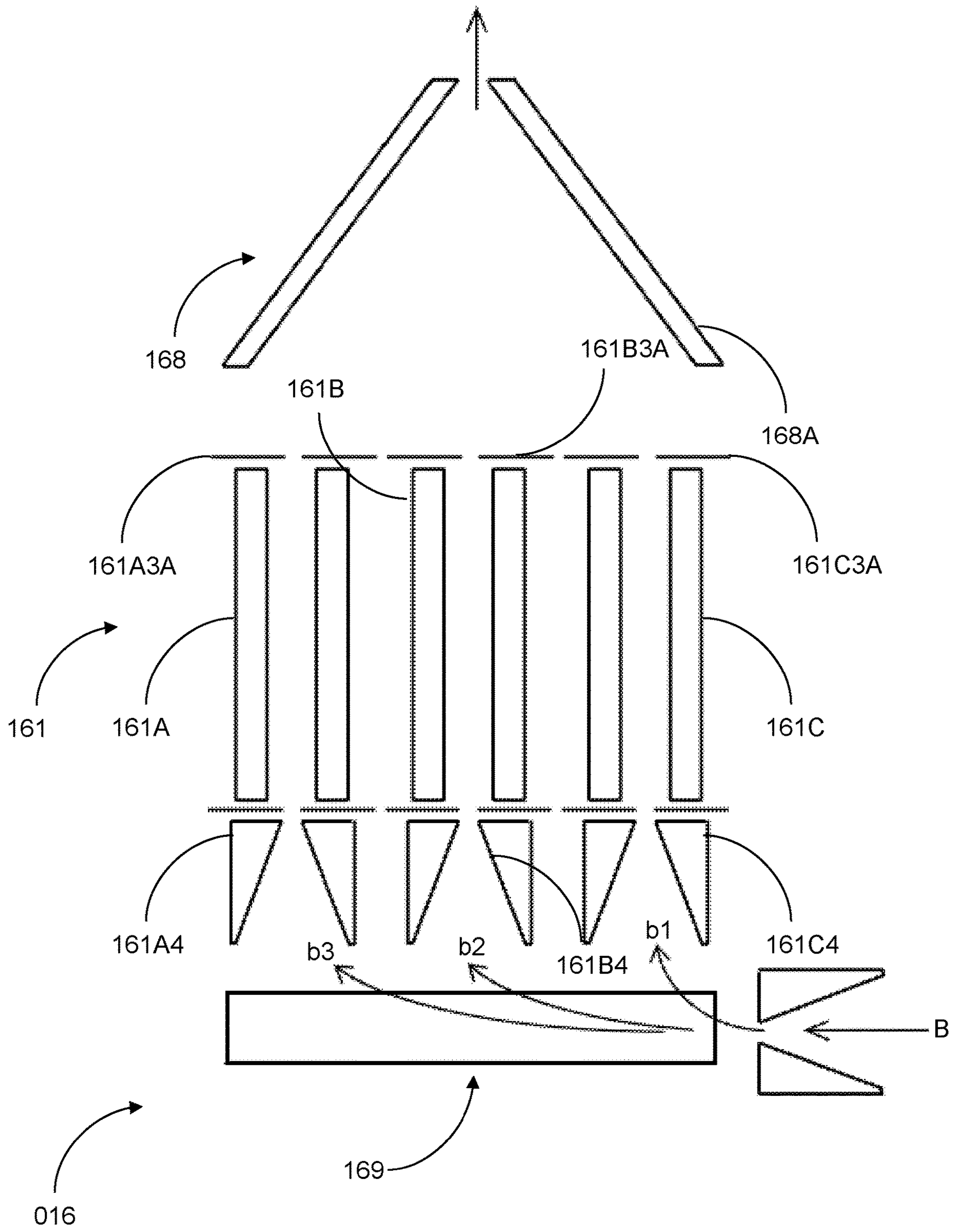
FIG. 16 schematically depicts an apparatus according to an exemplary embodiment.

FIG. 16 schematically depicts an apparatus and a method according to an exemplary embodiment.

The apparatus 016 is generally as described with respect to the apparatus 10 mutatis mutandis. In this example, the array of RF ion accumulation devices 161 includes three RF ion accumulation devices 161A, 161B, 161C, including the first RF ion accumulation device 161A, disposed mutually in parallel (also known as a parallel multi-segment RF ion accumulation device). The apparatus 16 is configured to partition incoming ion beam B into multiple m/z-range resolved beamlets b1, b2, b3 using a pre-separator ion optical component 169.

In this example, the pre-separator ion optical component 169 comprises a quadrupole ion-guide operated <1 mbar pressure and supplied with RF potentials for radial confinement and further configured with a spatially varying axial DC potential profile established by segmentation of the quadrupole pole-electrodes or by embedded DC-only electrodes with a field component penetrating into the RF field.

In this example, each of the RF ion accumulation devices 161A, 161B, 161C is configured with an ion funnel 161A4, 161B4, 161C4 for receiving and focusing the transversely ejected ions from the >1 mbar pressure region of the pre-separator device 169 into the desired operating pressure of the parallel array of RF ion accumulation devices 161, where the AC field barrier is effective in releasing ions in a mass selective manner with high efficiency (<0.1 mbar).

In this example, each transversely ejected ion beamlet is directed into a corresponding parallel RF ion accumulation device 161A, 161B, 161C of the array of RF ion accumulation devices 161. In this example, the apparatus 16 comprises a set of ion manifold devices 168, including a first ion manifold device 168A, configured to guide ions out of the respective RF ion accumulation devices of the array 161 thereof; wherein the first ion manifold device 168A comprises an ion funnel.

In this example, the respective RF ion accumulation devices 161A, 161B, 161C are configured to mass-selectively release ions into the ion funnel 168A (for example, a common or single ion funnel), configured to receive ions from all RF ion accumulation devices 161A, 161B, 161C sequentially releasing ions, and further configured to focus and transmit these ions toward a quadrupole mass filter and/or toward a fragmentation device disposed further downstream.

Figure 17:
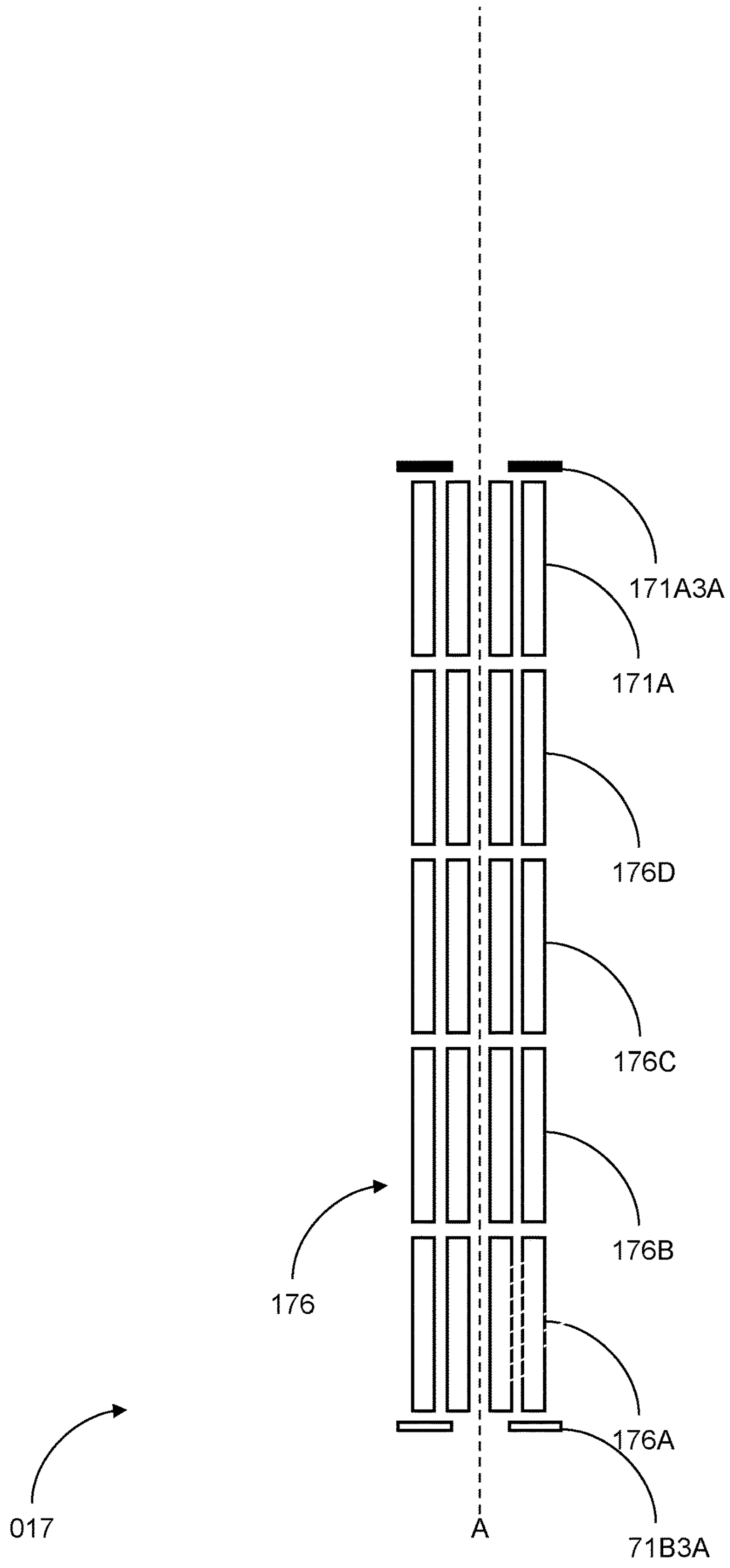
FIG. 17 schematically depicts an apparatus according to an exemplary embodiment.

FIG. 17 schematically depicts an apparatus 017 according to an exemplary embodiment, in more detail. The apparatus 017 is generally as described with respect to the apparatus 6 mutatis mutandis.

In this example, the first RF ion accumulation device 171A comprises an octupole. In this example, the apparatus 017 comprises an ion storage device 176, disposed upstream of the array of RF ion accumulation devices 171, configured to store ions, for example from the continuous ion flux from the ion source, when the array of RF ion accumulation devices 171 is configured in the respective first configurations. In this example, the ion storage device 176 comprises a segmented octupole, including four segments 176A, 176B, 176C, 176D. By controlling the DC potentials applied to the respective segments 176A, 176B, 176C, 176D, ions from the continuous ion flux may be stored in one or more segments and transferred to the first RF ion accumulation device 171A, as described with reference to FIG. 18.

Figure 18:
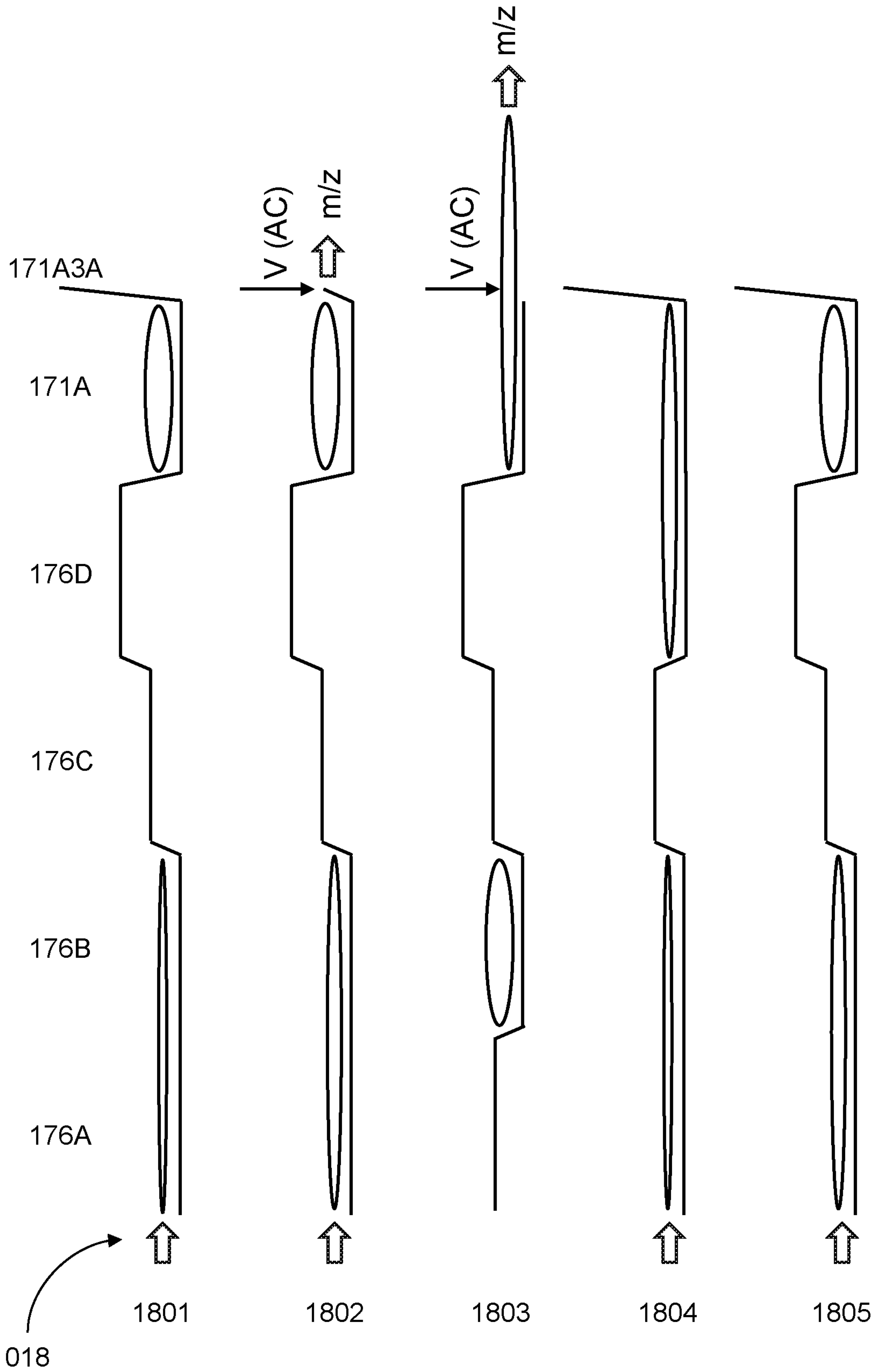
FIG. 18 schematically depicts a method according to an exemplary embodiment.

FIG. 18 schematically depicts a method of controlling the apparatus 017, described with reference to FIG. 17.

In more detail, FIG. 18 schematically shows the DC potentials applied to the respective segments 176A, 176B, 176C, 176D of the ion storage device 176 and the first RF ion accumulation device 171A, together with the AC voltage applied to the first electrode 171A3A, for 6 steps 1801 to 1806.

At step 1801, a first group of ions is accumulated in the first RF ion accumulation device 171A, confined axially by the DC potential applied to segment 176D and the AC voltage applied to the first electrode 171A3A (i.e. the first configuration). In parallel, a second group of ions is received in segments 176A and 176B, from the continuous ion flux, and confined axially by the DC potential applied to segment 176C.

At step 1802, the AC voltage applied to the first electrode 171A3A is reduced and the first group of ions begins to exit the first RF ion accumulation device 171A, in m/z order from relatively higher m/z to relatively lower m/z (i.e. the second configuration). In parallel, the second group of ions continues to be received in segments 176A and 176B, from the continuous ion flux, and confined axially by the DC potential applied to segment 176C.

At step 1803, the AC voltage applied to the first electrode 171A3A is further reduced and the first group of ions continues to exit the first RF ion accumulation device 171A, in m/z order from relatively higher m/z to relatively lower m/z (i.e. the second configuration). In parallel, the second group of ions is transferred from segment 176A to segment 176B and confined axially by the DC potentials applied to segments 176A and 176C.

At step 1804, the AC voltage applied to the first electrode 171A3A is increased (i.e. the first configuration), after the first group of ions has exited the first RF ion accumulation device. In parallel, the second group of ions is transferred from segment 176B to segment 176D and the first RF ion accumulation device 171A and confined axially by the DC potential applied to segment 176C and the AC voltage applied to the first electrode 171A3A (i.e. the first configuration). In parallel, a third group of ions is received in segments 176A and 176B, from the continuous ion flux, and confined axially by the DC potential applied to segment 176C.

Step 1805 is generally as described with reference to step 1801 mutatis mutandis. At step 1805, the second group of ions is accumulated in the first RF ion accumulation device 171A, confined axially by the DC potential applied to segment 176D and the AC voltage applied to the first electrode 171A3A (i.e. the first configuration). In parallel, the third group of ions continues to be received in segments 176A and 176B, from the continuous ion flux, and confined axially by the DC potential applied to segment 176C.

The steps 1801 to 1804 are thus repeated, providing accumulation and m/z ordered release in parallel with storage upstream and resulting in an ion utilization efficiency approaching 100%.

Figure 19:
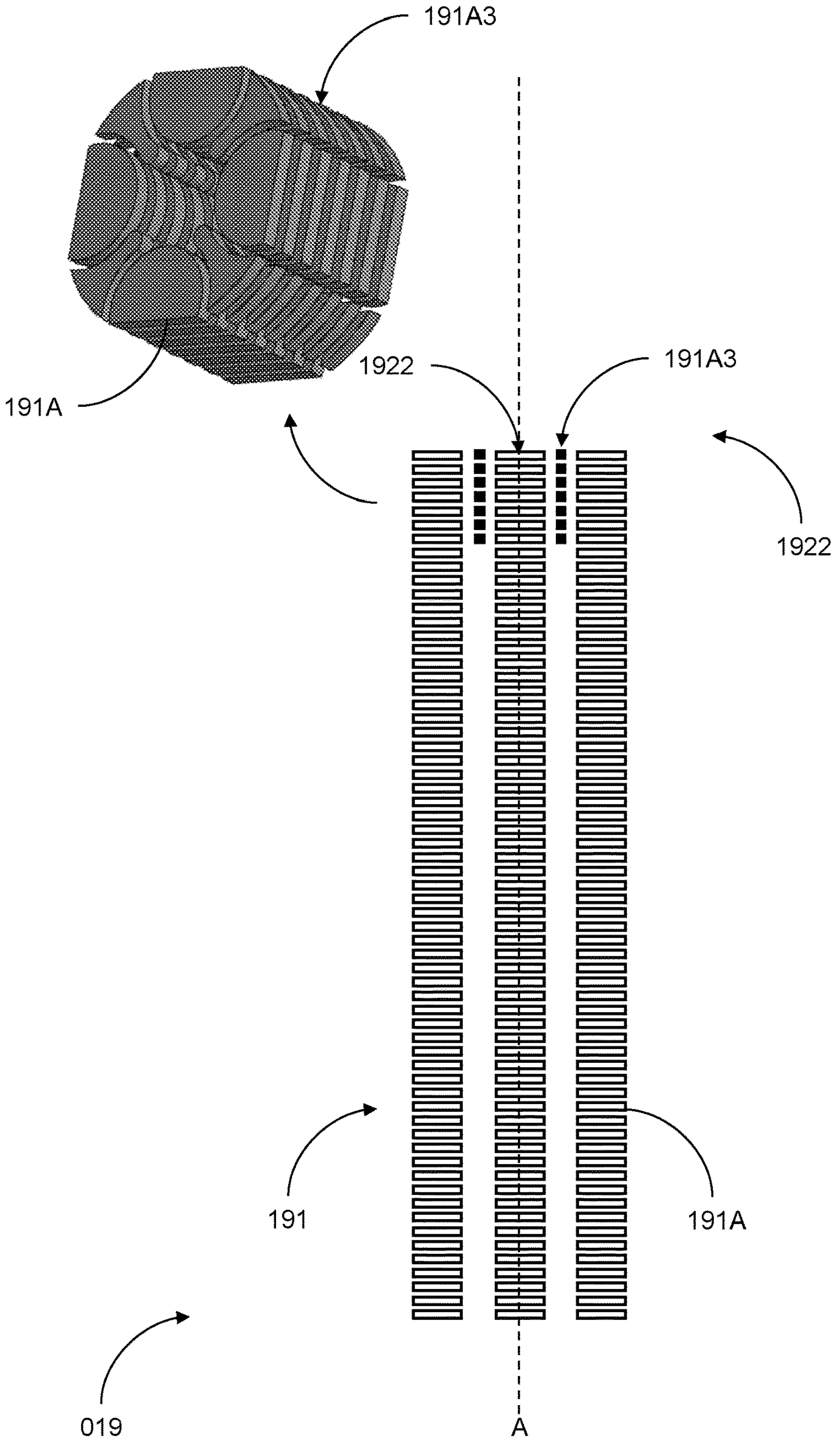
FIG. 19 schematically depicts an apparatus according to an exemplary embodiment.

FIG. 19 schematically depicts an apparatus 019 according to an exemplary embodiment, in more detail. The apparatus 019 is generally as described with respect to the apparatus 5 mutatis mutandis.

In this example, the first RF ion accumulation device 191A comprises a stacked electrode ion guide, defining a quadrupole ion guide.

In this example, the first set of electrodes 191A3 includes pin electrodes that extend radially inwards towards the axis A, between the stacked quadrupole electrodes. In this example, the first set of electrodes 191A3 includes seven sets of stacked pin electrodes, aligned with the stacked electrodes of the first RF ion accumulation device 191A. In this example, the first set of electrodes 191A3 extends upstream along the first RF ion accumulation device 191A from the first ion exit 1922. In this way, the electric field due to the AC voltage applied to the first set of electrodes 191A3 penetrates more deeply into the first RF ion accumulation device 191A.

It should be understood that such pin electrodes may be used with multipole RF ion accumulation devices, for example quadrupole, hexapole, octupole or higher order multipole such as dodecapole, mutatis mutandis.

Notes

Although a preferred embodiment has been shown and described, it will be appreciated by those skilled in the art that various changes and modifications might be made without departing from the scope of the invention, as defined in the appended claims and as described above.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus comprising:

an array of RF ion accumulation devices, including a first RF ion accumulation device having a first ion entrance, a first ion exit and a first set of electrodes, including a first electrode, disposed at, proximal and/or adjacent to the first ion exit;

an ion fragmentation device having an ion entrance and an ion exit, the ion fragmentation device being disposed mutually in series with the array of RF ion accumulation devices and being disposed downstream of the array of RF ion accumulation devices;

a set of power supplies, including a first power supply electrically coupled to the first set of electrodes and configured to provide a first axial potential barrier at, proximal and/or adjacent to the first ion exit, wherein the first axial potential barrier is mass to charge ratio m/z dependent and provided by a first AC voltage having an amplitude and a frequency; and a controller configured to control the set of power supplies in:

a first configuration, wherein the amplitude of the first AC voltage is constant and whereby the first axial potential barrier prevents exit of ions, within a selected mass to charge ratio m/z range, from the first RF ion accumulation device via the first ion exit; and a second configuration, wherein the amplitude of the first AC voltage is decreased as a function of time and whereby the first axial potential barrier permits exit of the ions, within successive selected mass to charge ratio m/z sub-ranges of the selected mass to charge ratio m/z range, from relatively higher mass to charge ratio m/z to relatively lower mass to charge ratio m/z as a function of time, from the first RF ion accumulation device via the first ion exit.

2. The apparatus according to claim 1, further comprising a first axial driving force means for urging ions from the first ion entrance towards the first ion exit;

wherein the first axial driving force means comprises and/or is provided by a DC voltage gradient and/or a travelling wave; and wherein the controller is configured to dynamically control the DC voltage gradient and/or the travelling wave to account for space-charge dependence on the first AC voltage.

3. The apparatus according to claim 1, wherein the controller is configured to control the set of power supplies in the second configuration to decrease the first axial potential barrier to permit exit of ions.

4. The apparatus according to claim 1, wherein:

the ion fragmentation device has a set of electrodes, including a first electrode, disposed at, proximal and/or adjacent to the ion exit;

the set of power supplies includes a power supply electrically coupled to the set of electrodes and configured to provide an axial potential barrier at, proximal and/or adjacent to the ion exit; and the controller is arranged to control the set of power supplies in:

a first arrangement, wherein the axial potential barrier prevents exit of ions from the ion fragmentation device via the ion exit; and a second arrangement, wherein the axial potential barrier permits exit of ions, within a selected mass to charge ratio m/z range, from the ion fragmentation device via the ion exit.

5. The apparatus according to claim 1, wherein the array of RF ion accumulation devices includes NRF ion accumulation devices, including the first RF ion accumulation device, wherein N is a natural number greater than or equal to 2.

6. The apparatus according to claim 5, wherein:

the array of RF ion accumulation devices includes m RF ion accumulation devices, including the first RF ion accumulation device, disposed mutually in series, wherein m is a natural number less than or equal to N; and the controller is configured to control the set of power supplies in the respective first configurations to dynamically provide respective amplitudes of the respective axial potential barriers of the m RF ion accumulation devices.

7. The apparatus according to claim 6, wherein the controller is configured to control the set of power supplies in the respective first configurations to provide monotonically increasing respective amplitudes of the respective axial potential barriers of the m RF ion accumulation devices, disposed mutually in series.

8. The apparatus according to claim 6, wherein the controller is configured to control the set of power supplies to move from the respective first configurations to the respective second configurations in reverse sequence.

9. The apparatus according to claim 7, wherein the array of RF ion accumulation devices includes n RF ion accumulation devices, including the first RF ion accumulation device, disposed mutually in parallel, wherein n is a natural number less than or equal to N.

10. The apparatus according to claim 1, further comprising an ion storage device, disposed upstream of the array of RF ion accumulation devices, configured to store ions and to synchronously transfer the stored ions to the first RF accumulation device when the first RF accumulation device is configured in the first configuration.

11. The apparatus according to claim 1, further comprising a set of ion manifold devices, including a first ion manifold device, configured to guide ions into and/or out of the respective RF ion accumulation devices of the array thereof; wherein the first ion manifold device comprises an ion ejector and/or an ion funnel.

12. The apparatus according to claim 1, wherein the first axial potential barrier comprises one or more axial potential barriers selected from the group consisting of: an AC signal applied to the first electrode; an AC signal applied to electrodes surrounding the accumulation volume of the RF ion accumulation device; and an AC signal applied to auxiliary RF-free electrodes of the RF ion accumulation device.

13. The apparatus according to claim 1, wherein the first RF ion accumulation device comprises and/or is a RF multipole ion guide and/or a RF stacked ring ion guide.

14. The apparatus according to claim 1, wherein the first set of electrodes includes a second electrode configured to attenuate penetration of the first axial potential barrier downstream thereof.

15. The apparatus according to claim 1, further comprising an ion guide having an ion entrance and an ion exit, the ion guide being disposed mutually in series with the array of RF ion accumulation devices and being disposed downstream of the array of RF ion accumulation devices; wherein the ion guide is configured to thermalize and/or radially focus ions ejected from the array of RF ion accumulation devices.

16. The apparatus according to claim 1, further comprising a quadrupole mass filter having an ion entrance and an ion exit, the quadrupole mass filter being disposed mutually in series with the array of RF ion accumulation devices and being disposed downstream of the array of RF ion accumulation devices; wherein the quadrupole mass filter is configured to filter at least a fraction of the ions exiting the array of RF ion accumulation devices, from relatively higher mass to charge ratio m/z to relatively lower mass to charge ratio m/z as a function of time, wherein an isolation window of the quadrupole mass filter corresponds with a selected mass to charge ratio m/z sub-range of the ions exiting the array of RF ion accumulation devices.

17. A method of mass spectrometry, the method comprising:

introducing ions into an array of RF ion accumulation devices, including a first RF ion accumulation device having a first ion entrance and a first ion exit;

preventing exit of the ions, within a selected mass to charge ratio m/z range, from the first RF ion accumulation device via the first ion exit by providing a first axial potential barrier at, proximal and/or adjacent to the first ion exit;

permitting exit of the ions, within a selected mass to charge ratio m/z sub-range of the selected mass to charge ratio m/z range, from the first RF ion accumulation device via the first ion exit by controlling the first axial potential barrier; and fragmenting the exiting ions, within the selected mass to charge ratio m/z sub-range of the selected mass to charge ratio m/z range, in an ion fragmentation device, having an ion entrance and an ion exit.

18. The method according to claim 17, further comprising operating the first RF ion accumulation device at a pressure below the ion mobility pressure regime.

19. The method according to claim 17, wherein controlling the first axial potential barrier comprises decreasing the first axial potential barrier.

20. The method according to claim 17, further comprising:

preventing exit of the fragmented ions, within a selected mass to charge ratio m/z range, from the ion fragmentation device via the ion exit by providing an axial potential barrier at, proximal and/or adjacent to the ion exit; and permitting exit of the fragmented ions, within a selected mass to charge ratio m/z sub-range of the selected mass to charge ratio m/z range, from the ion fragmentation device via the ion exit by controlling the axial potential barrier;

wherein controlling the axial potential barrier comprises decreasing the axial potential barrier.

* * * * *